(12) United States Patent
Hrubec et al.

(10) Patent No.: US 11,952,948 B2
(45) Date of Patent: Apr. 9, 2024

(54) TURBOMACHINE AND GEAR ASSEMBLY

(71) Applicant: GE Avio S.r.l., Rivalta di Torino (IT)

(72) Inventors: Juraj Hrubec, Prague (CZ); Davide Lauria, Turin (IT)

(73) Assignee: GE AVIO S.R.L., Rivalta di Torino (IT)

( * ) Notice: Subject to any disclaimer, the term of this patent is extended or adjusted under 35 U.S.C. 154(b) by 0 days.

(21) Appl. No.: 17/813,453

(22) Filed: Jul. 19, 2022

(65) Prior Publication Data
US 2022/0349350 A1 Nov. 3, 2022

Related U.S. Application Data

(63) Continuation of application No. 17/150,136, filed on Jan. 15, 2021, now Pat. No. 11,408,355.

(30) Foreign Application Priority Data

Jan. 15, 2020 (IT) .......................... 102020000000652

(51) Int. Cl.
*F02C 7/36* (2006.01)
*F02C 7/06* (2006.01)

(52) U.S. Cl.
CPC .................. *F02C 7/36* (2013.01); *F02C 7/06* (2013.01); *F05D 2260/40311* (2013.01)

(58) Field of Classification Search
CPC .. F02C 7/36; F02C 3/067; F02C 3/107; F16H 57/0486; F16H 1/28
See application file for complete search history.

(56) References Cited

U.S. PATENT DOCUMENTS

| | | |
|---|---|---|
| 3,861,139 A | 1/1975 | Jones |
| 3,903,690 A | 9/1975 | Jones |
| 5,010,729 A | 4/1991 | Adamson et al. |
| 8,336,290 B2 | 12/2012 | Glynn et al. |
| 8,863,643 B2 | 10/2014 | Powell |
| 11,149,650 B2 | 10/2021 | Adams et al. |
| 11,428,160 B2* | 8/2022 | Kamat ...................... F02C 3/06 |
| 2008/0022653 A1 | 1/2008 | Schilling |
| 2008/0060341 A1 | 3/2008 | Loisy |
| 2010/0205934 A1 | 8/2010 | Gallet |
| 2013/0192256 A1 | 8/2013 | Suciu et al. |

(Continued)

FOREIGN PATENT DOCUMENTS

| | | |
|---|---|---|
| CN | 104040117 A | 9/2014 |
| CN | 106968802 A | 7/2017 |

(Continued)

*Primary Examiner* — Derek D Knight
(74) *Attorney, Agent, or Firm* — Venable LLP; Peter T. Hrubiec; Michele V. Frank

(57) ABSTRACT

A turbomachine engine according to aspects of the present disclosure is provided. The engine includes a fan assembly including a plurality of fan blades, and a core engine surrounded by an outer casing. The core engine includes a power output component operably connected to the fan assembly, a first input power source and a second input power source. The first input power source is counter-rotatable relative to the second input power source. The core engine includes a gear assembly operably connected to the power output component and configured to receive power from the first input power source and the second input power source.

18 Claims, 30 Drawing Sheets

(56) References Cited

U.S. PATENT DOCUMENTS

| | | | |
|---|---|---|---|
| 2013/0195624 A1 | 8/2013 | Schwarz et al. | |
| 2014/0312177 A1 | 10/2014 | Gaonjur | |
| 2015/0354502 A1* | 12/2015 | Kuhne | F02K 3/072 |
| | | | 60/226.1 |
| 2016/0356225 A1* | 12/2016 | Sheridan | F02C 7/36 |
| 2018/0163665 A1 | 6/2018 | Eckett et al. | |
| 2018/0355951 A1 | 12/2018 | Stuart et al. | |
| 2019/0085715 A1* | 3/2019 | van der Merwe | F01D 1/24 |
| 2020/0200082 A1* | 6/2020 | Mondal | F02C 3/067 |

FOREIGN PATENT DOCUMENTS

| | | |
|---|---|---|
| CN | 110234839 A | 9/2019 |
| CN | 110520611 A | 11/2019 |
| CN | 110541759 A | 12/2019 |
| WO | 2014113372 A1 | 7/2014 |

\* cited by examiner

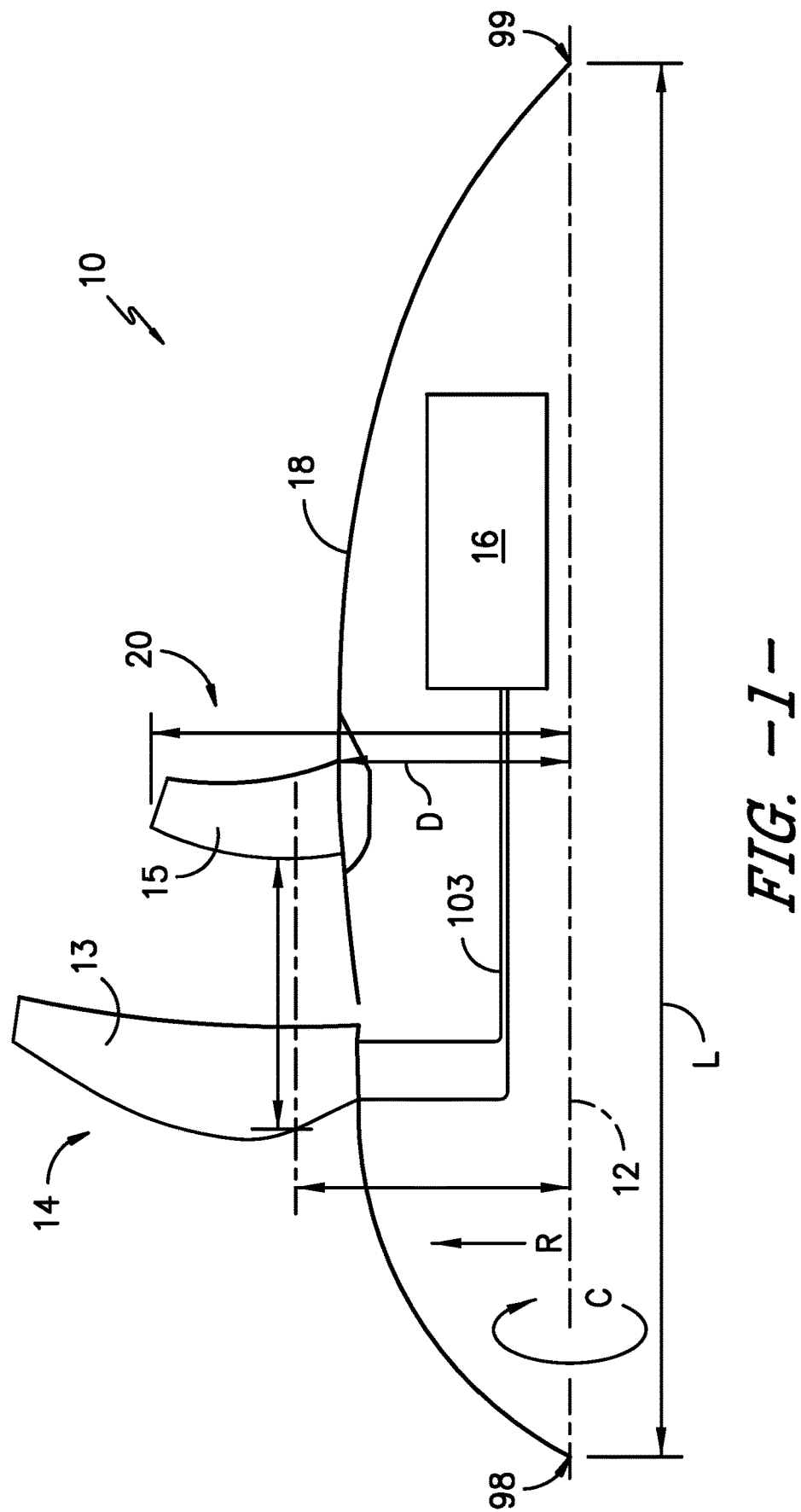
FIG. -1-

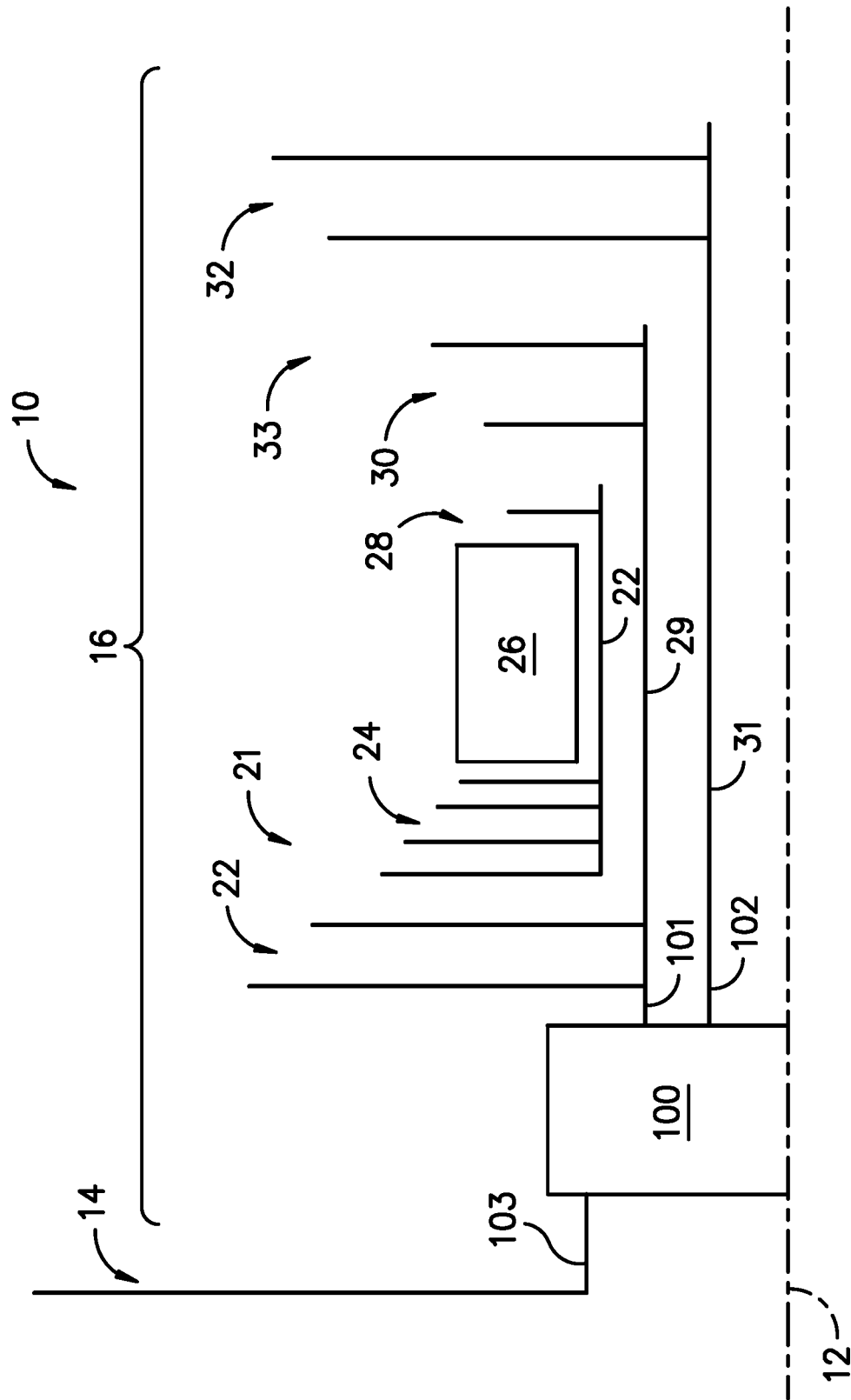
FIG. -2A-

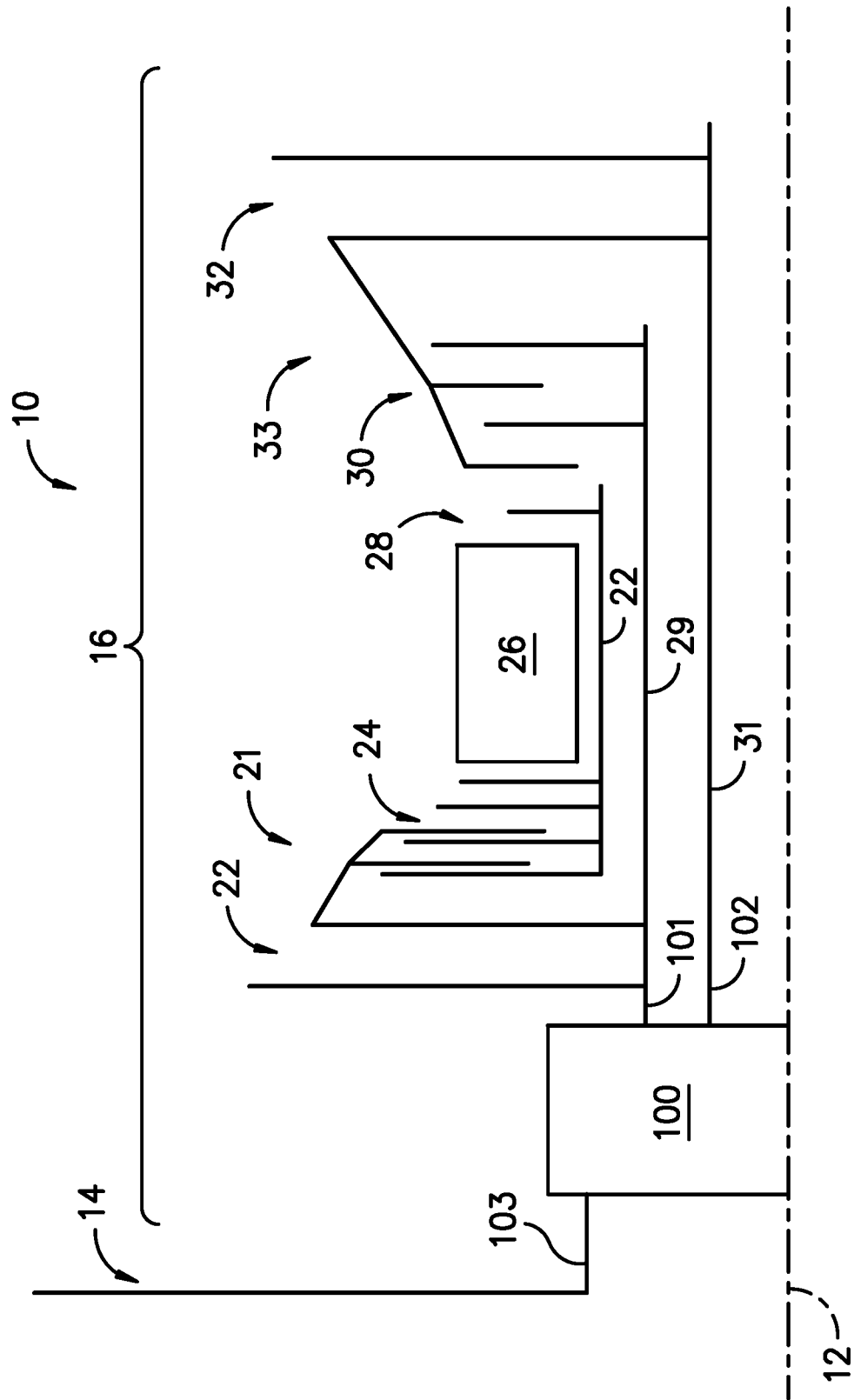
FIG. -2B-

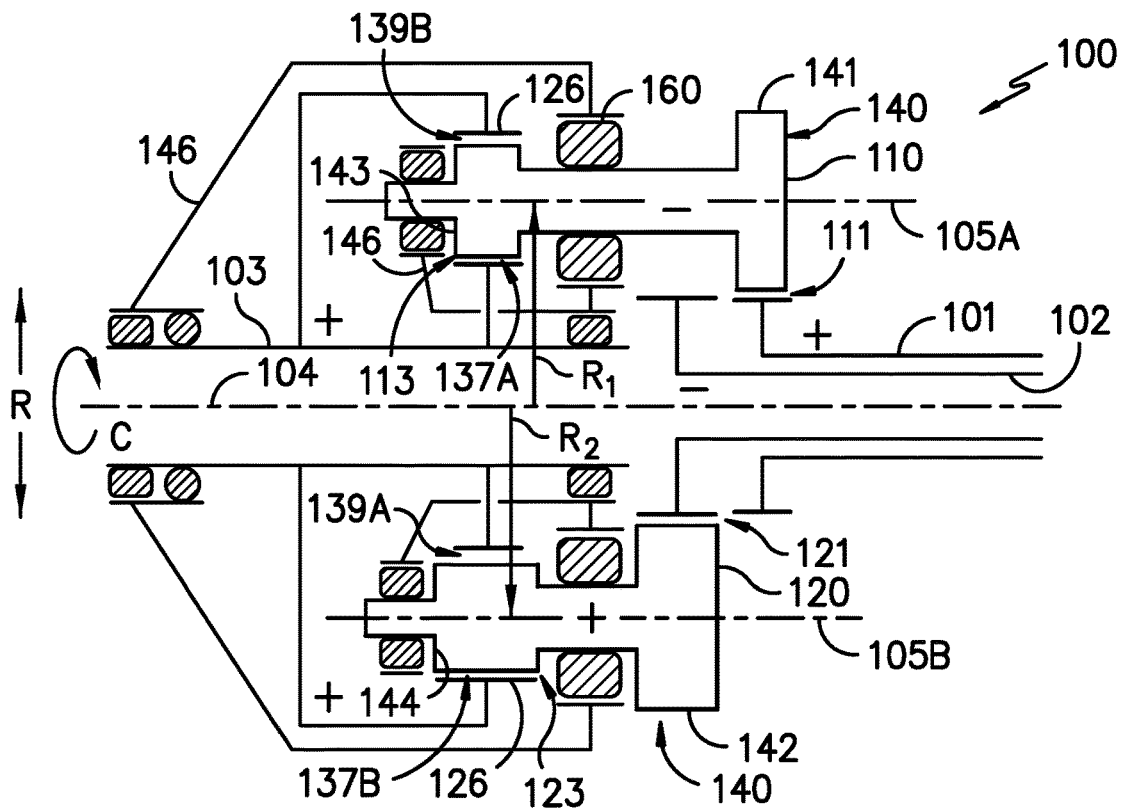
FIG. -3A-
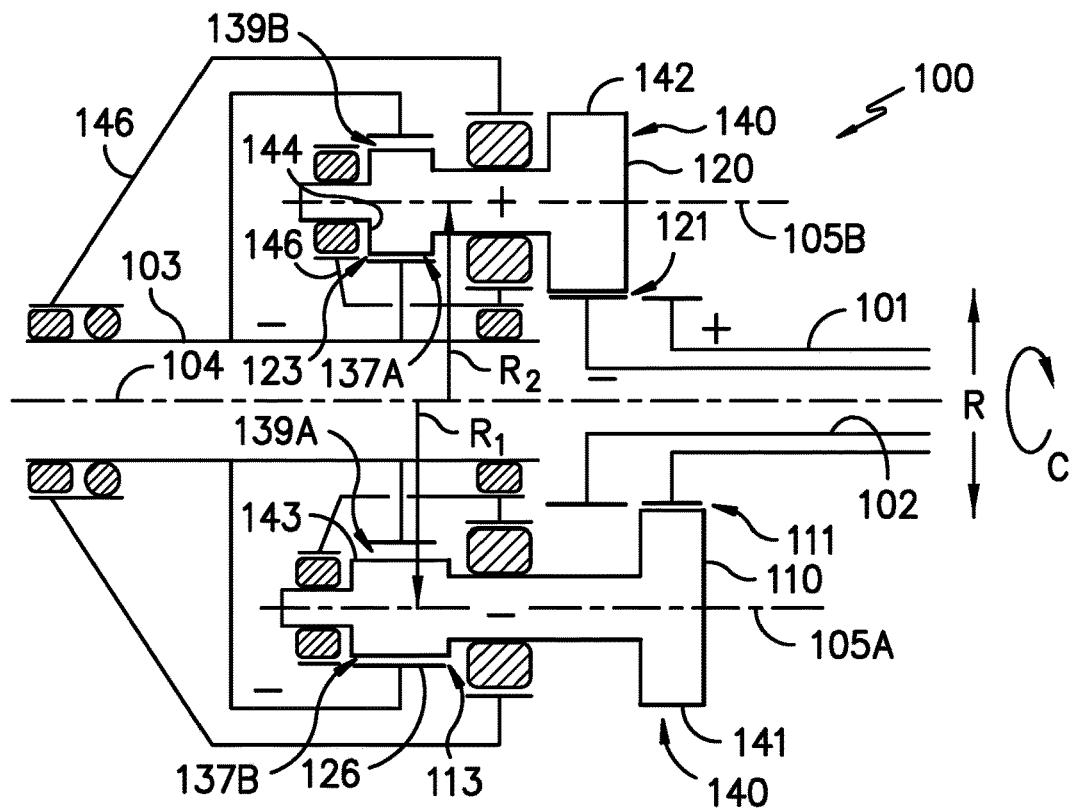
FIG. -3B-

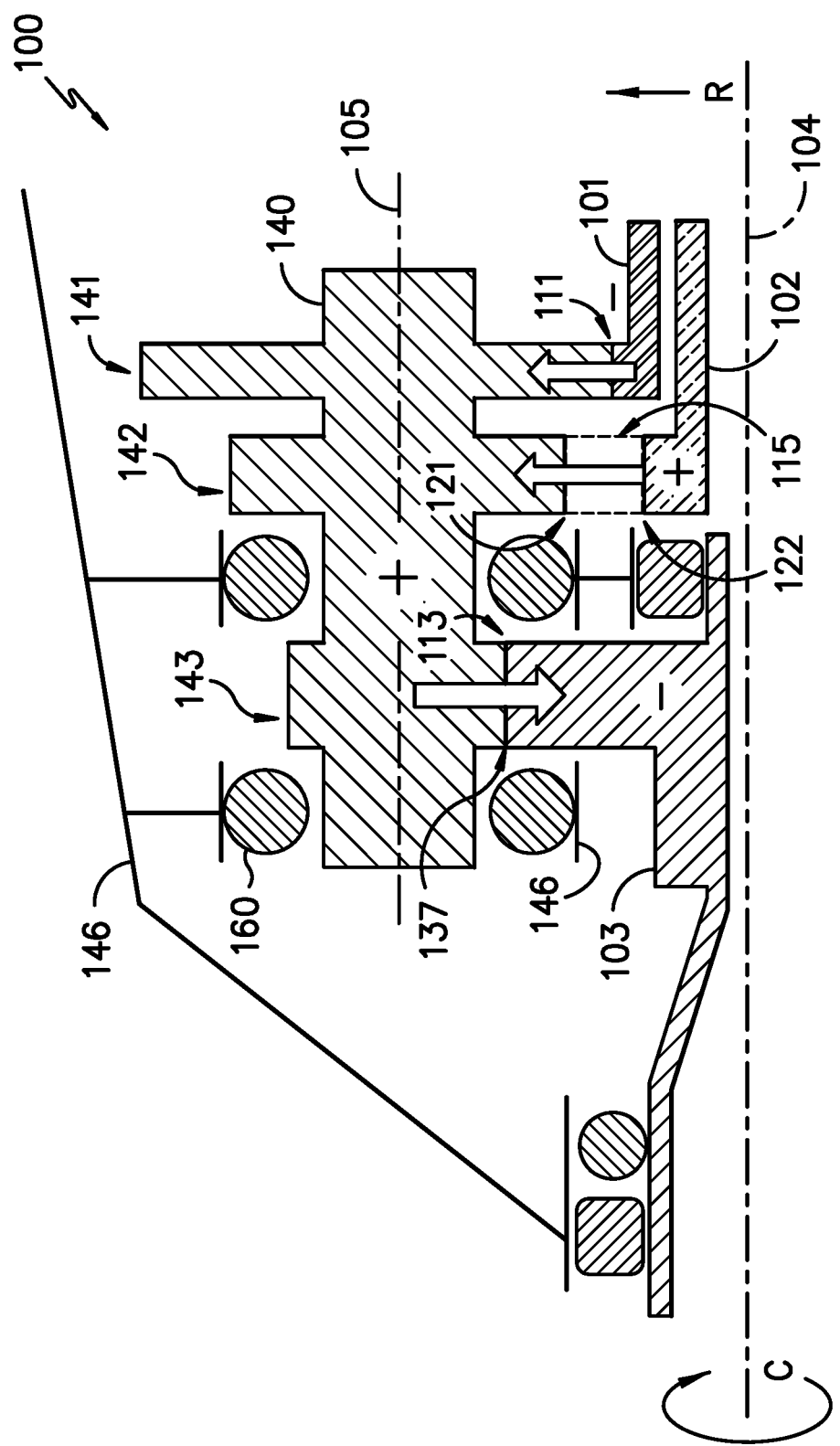
FIG. -4A-

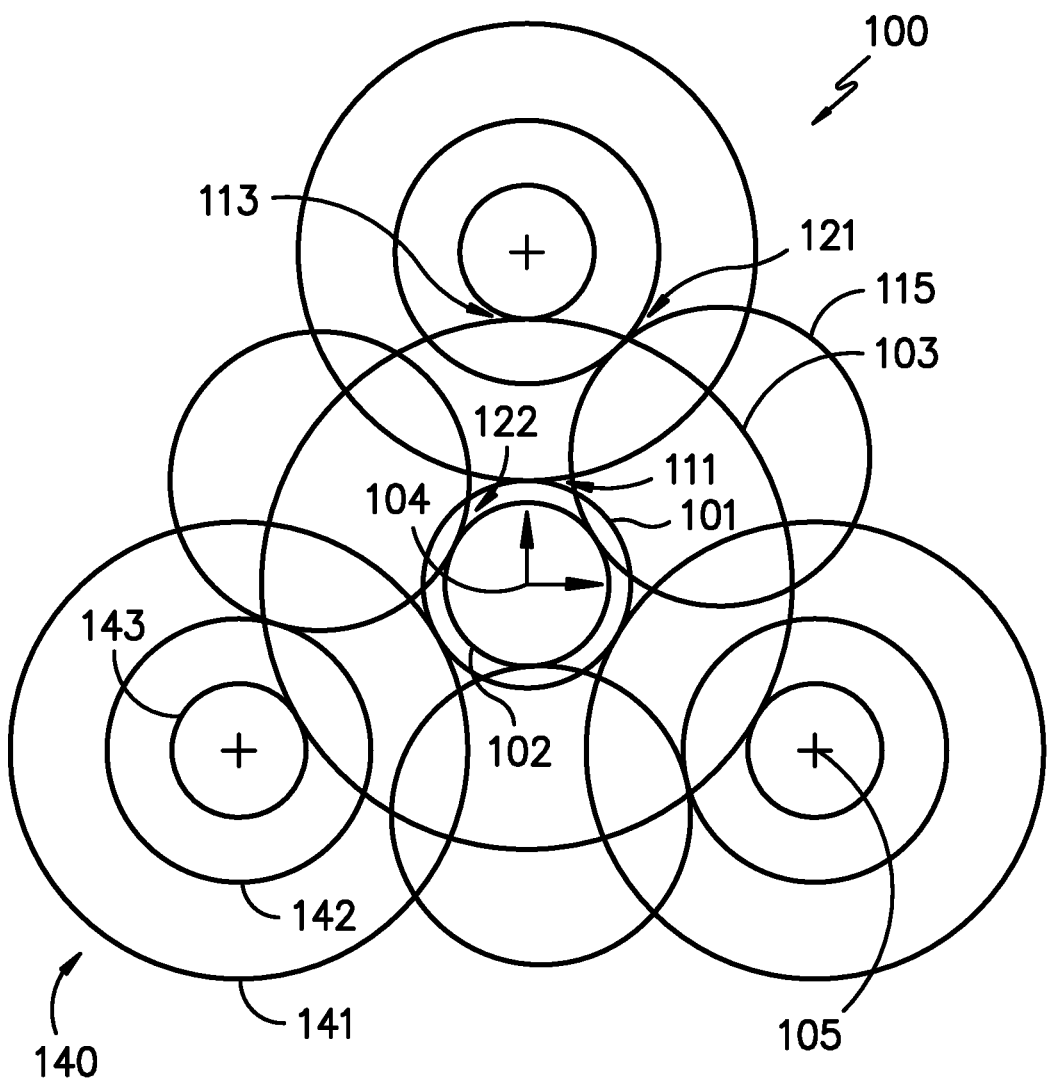
FIG. -4B-

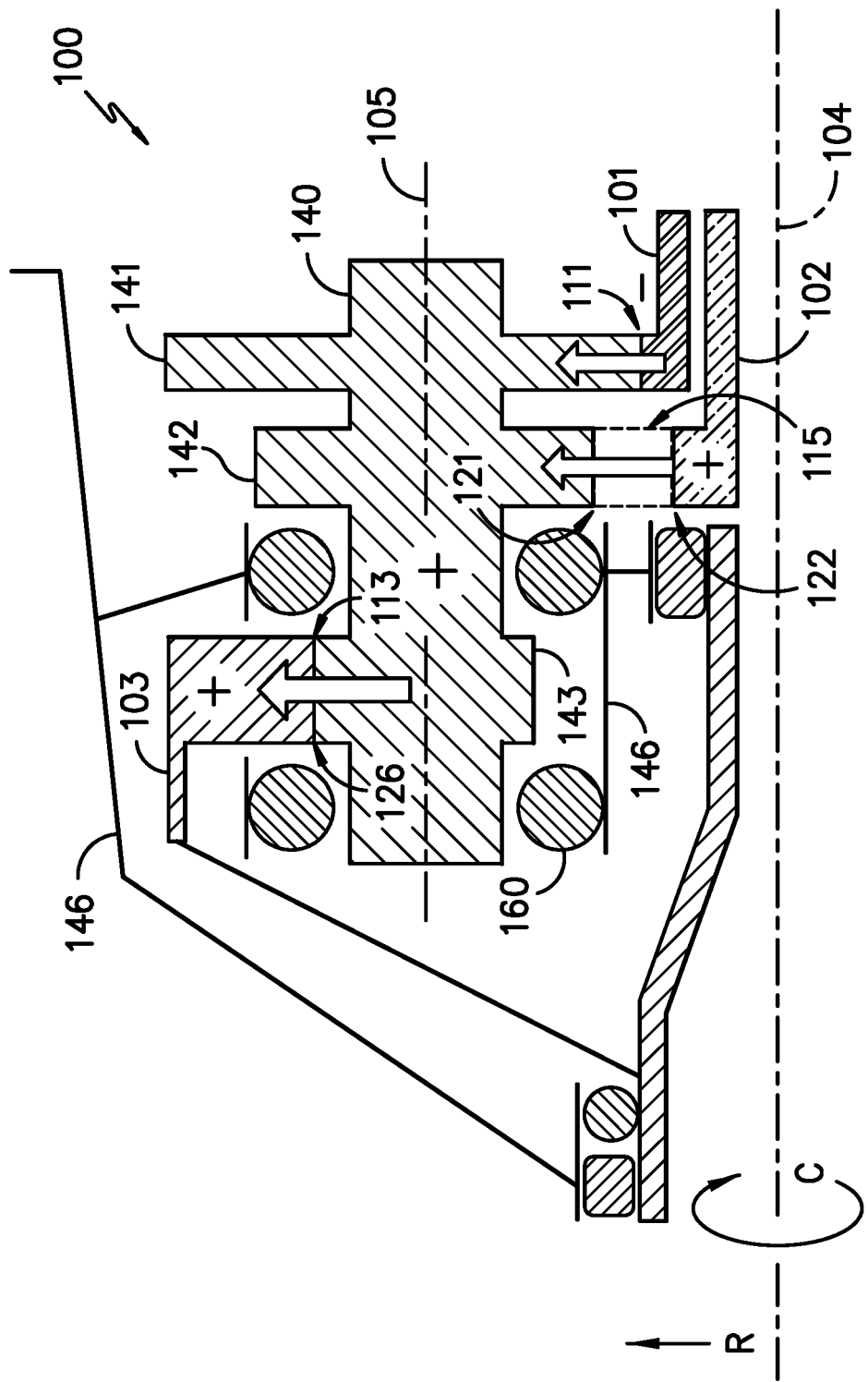
FIG. -5-

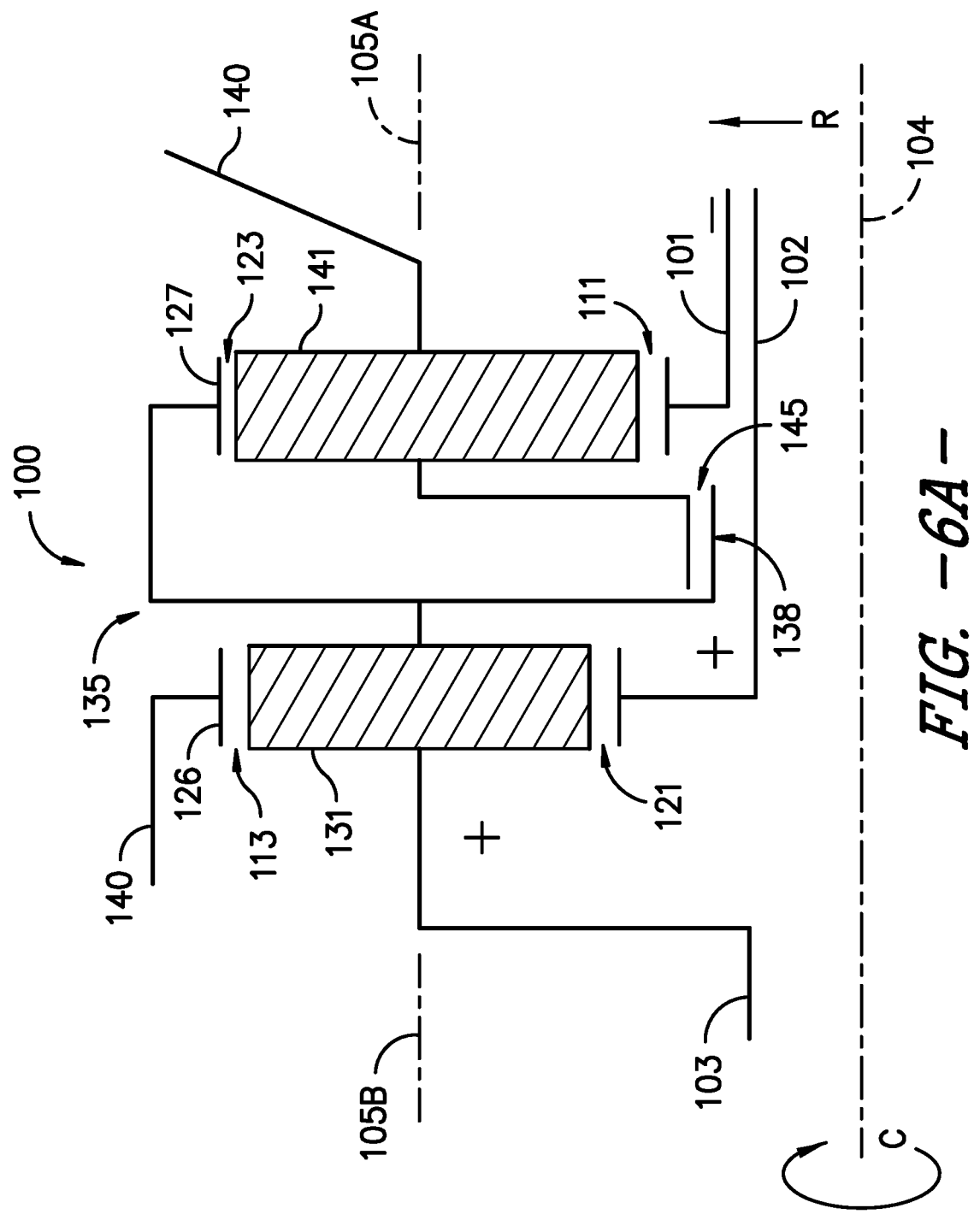

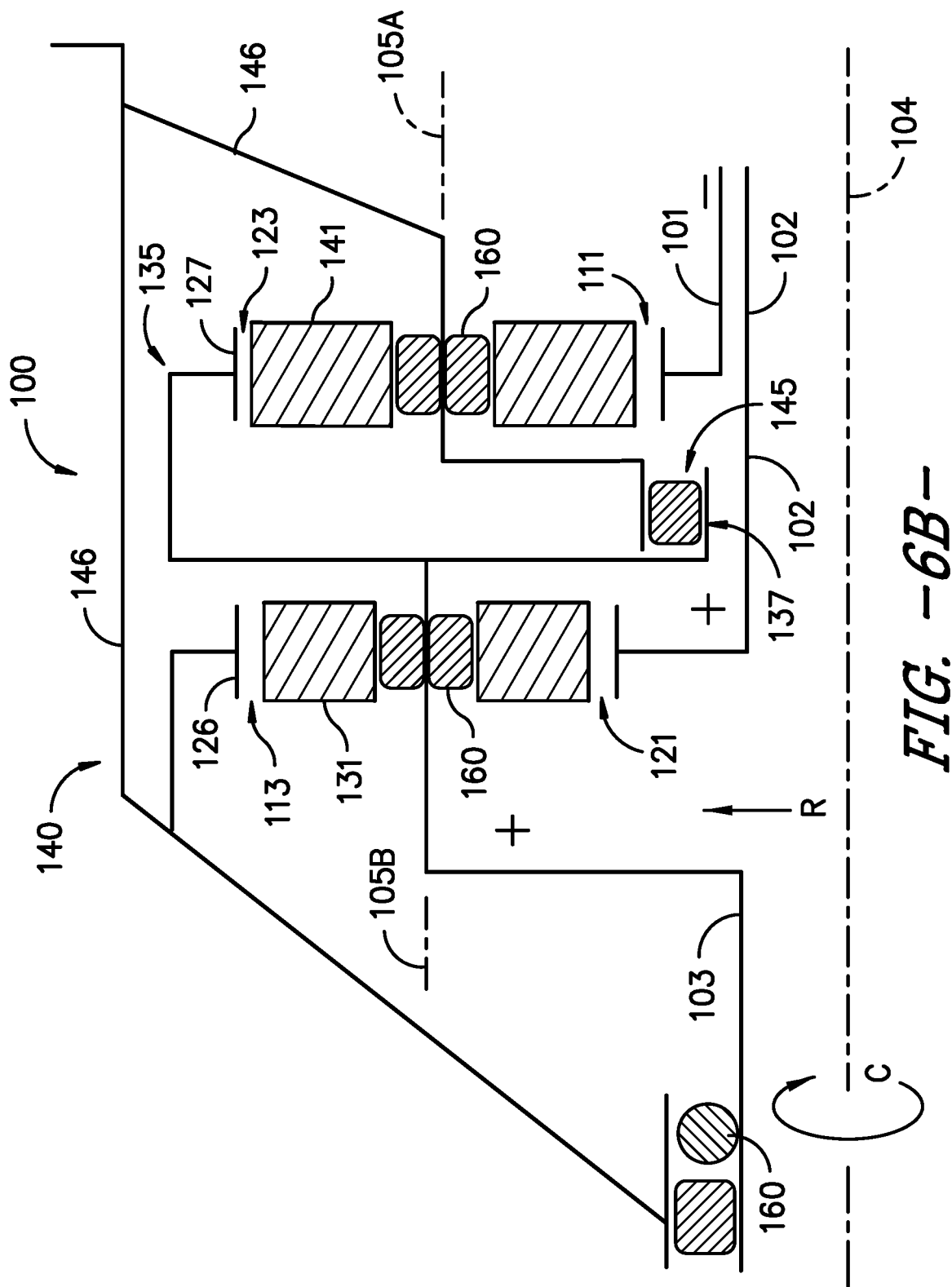
FIG. -6B-

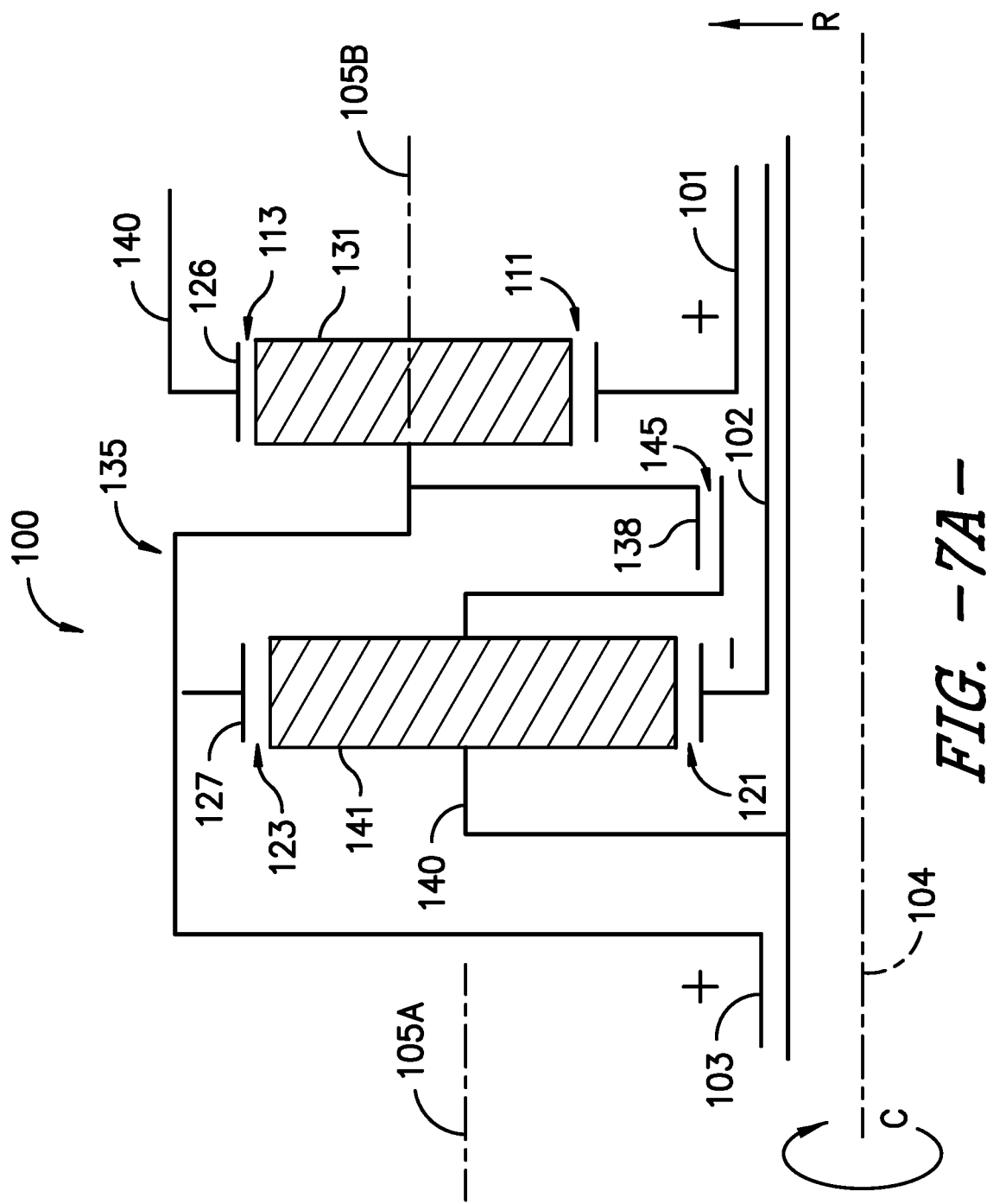
FIG. -7A-

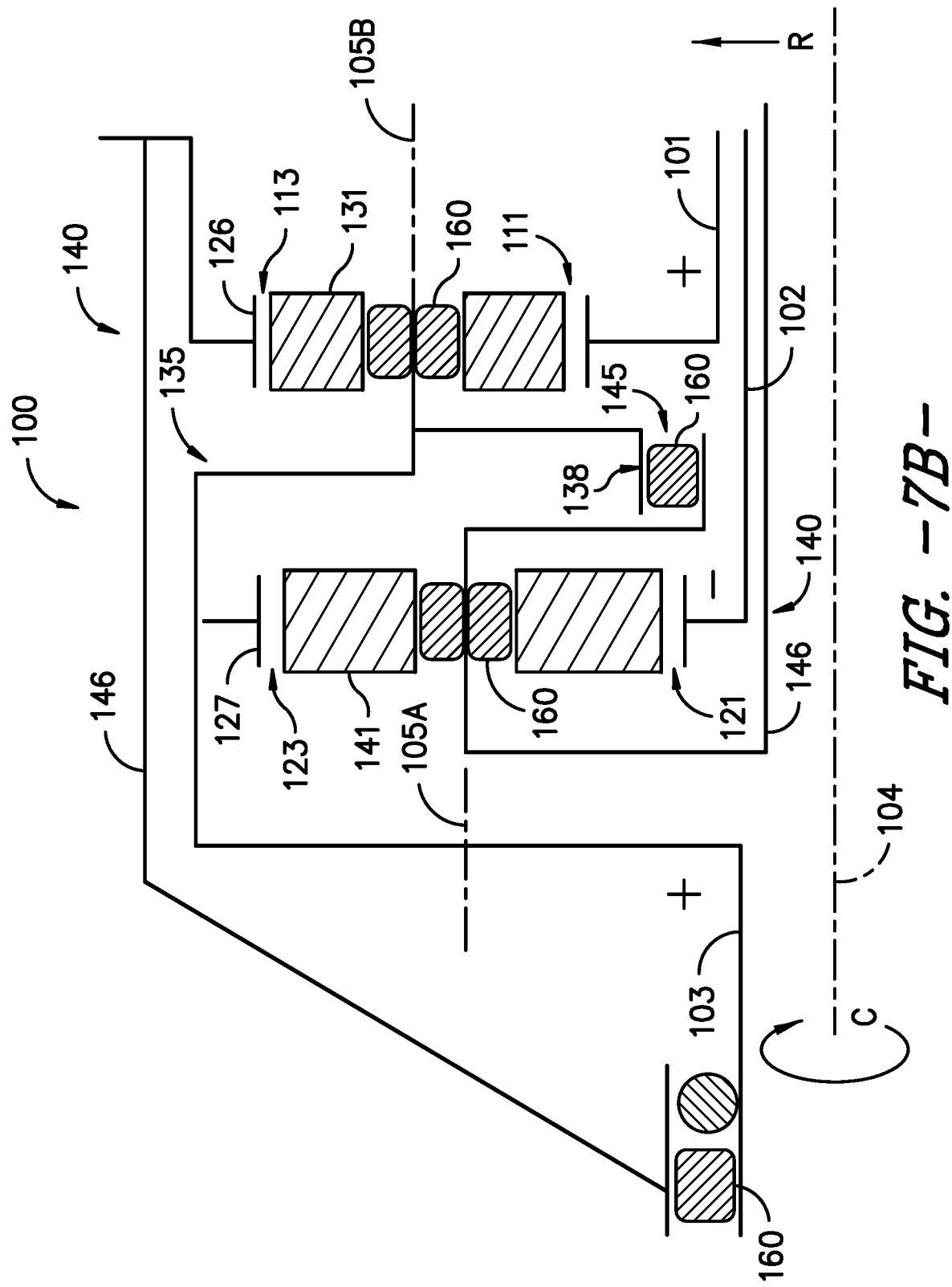
FIG. -7B-

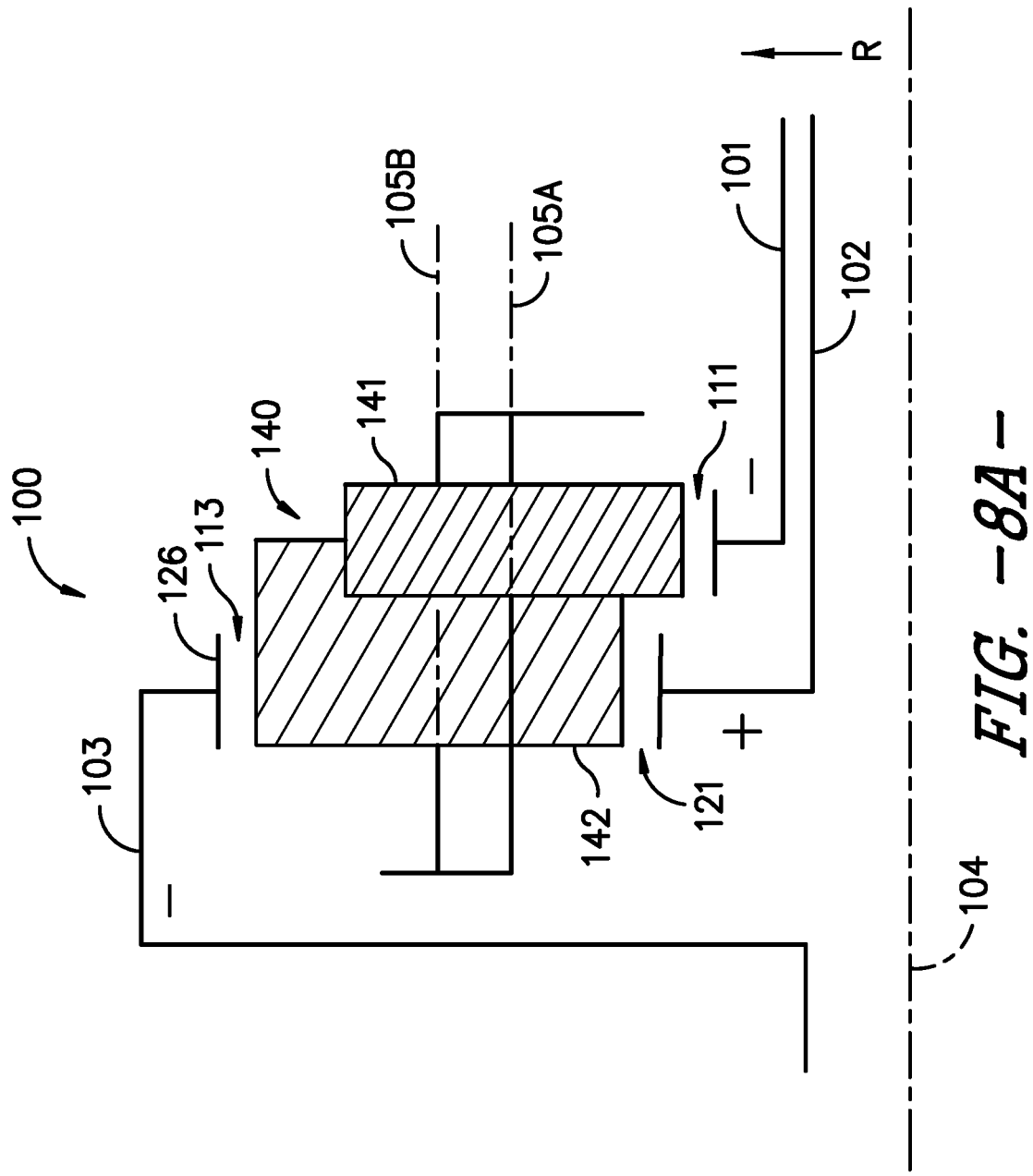
FIG. -8A-

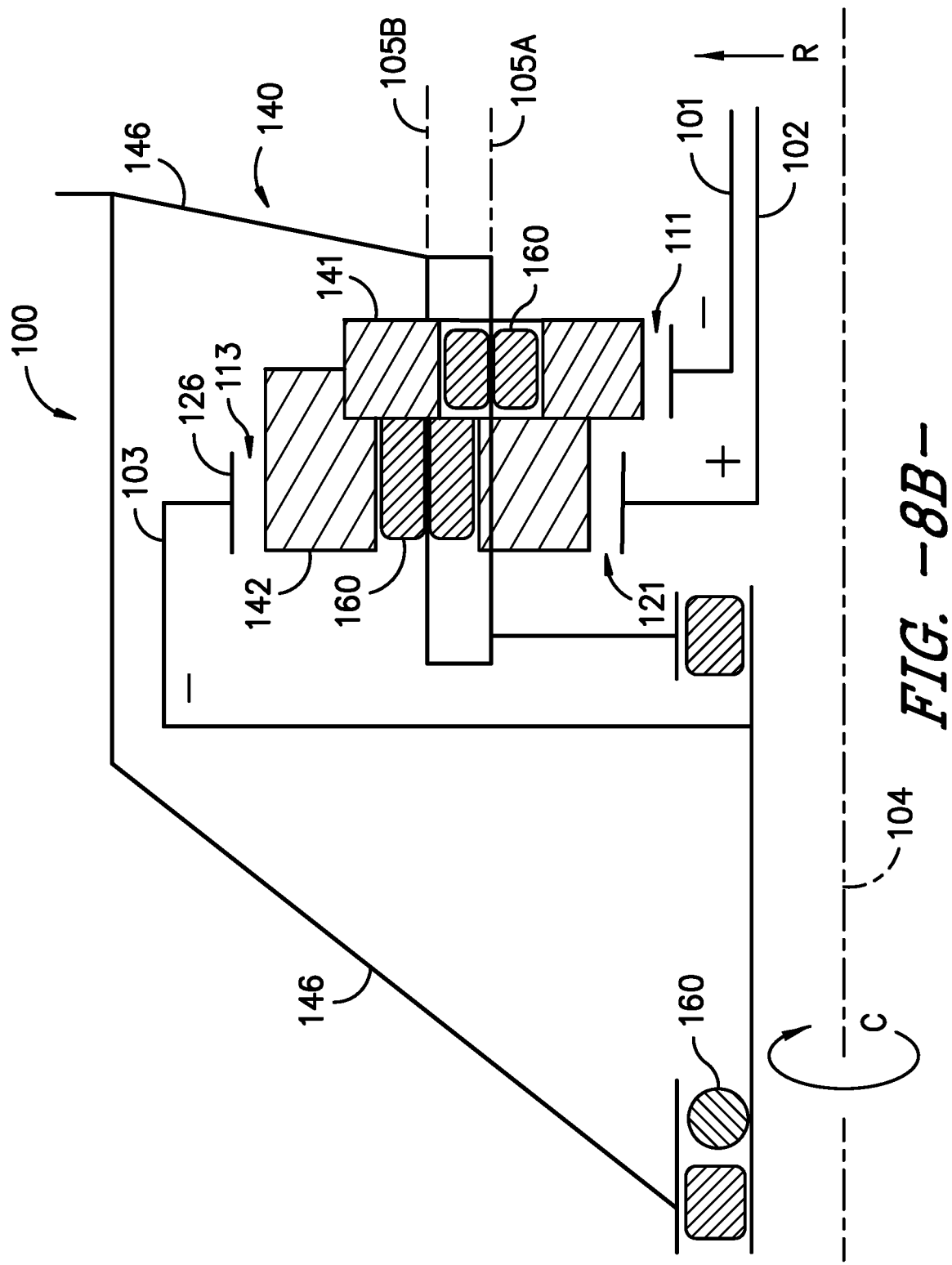
FIG. -8B-

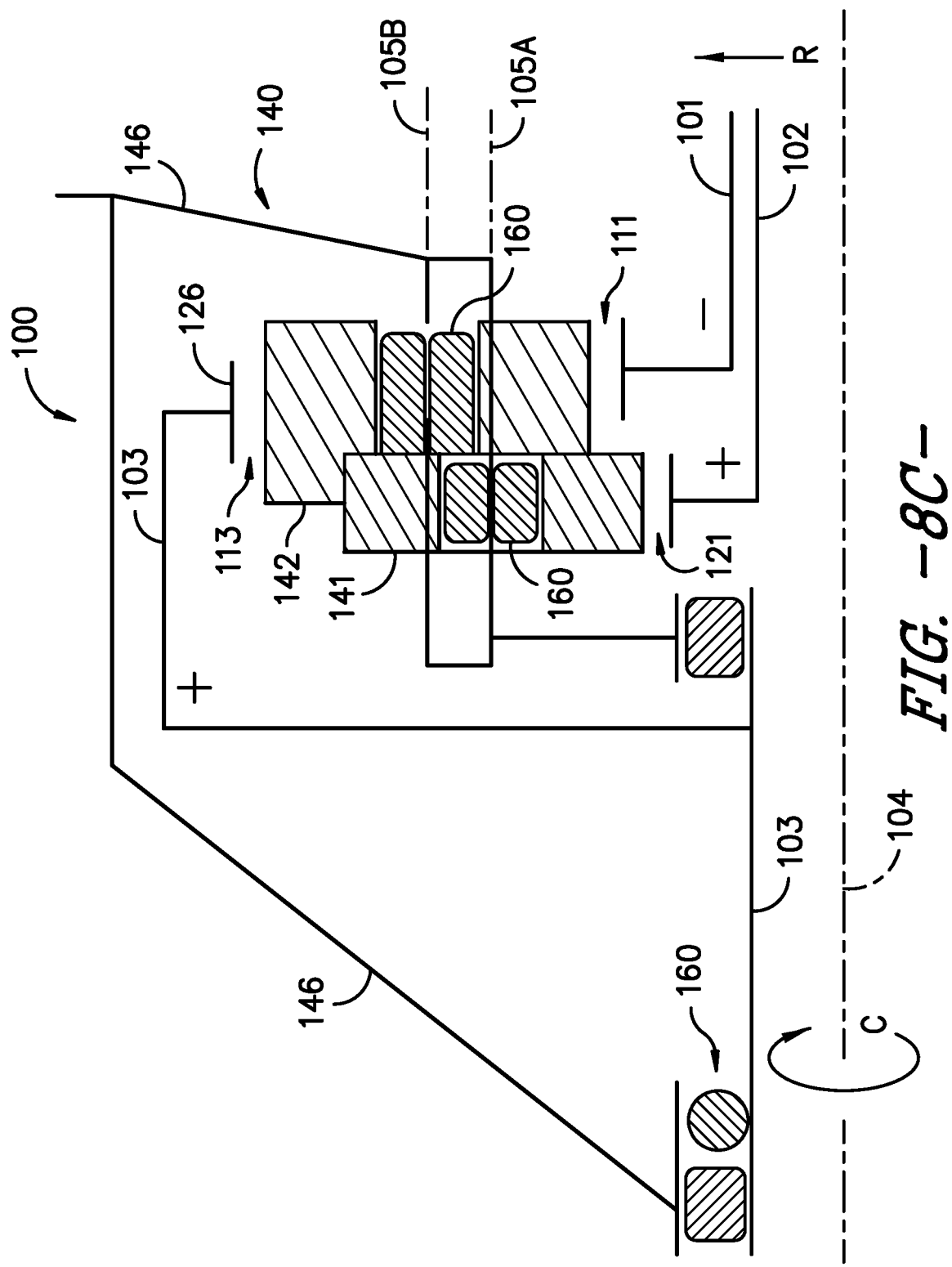
FIG. -8C-

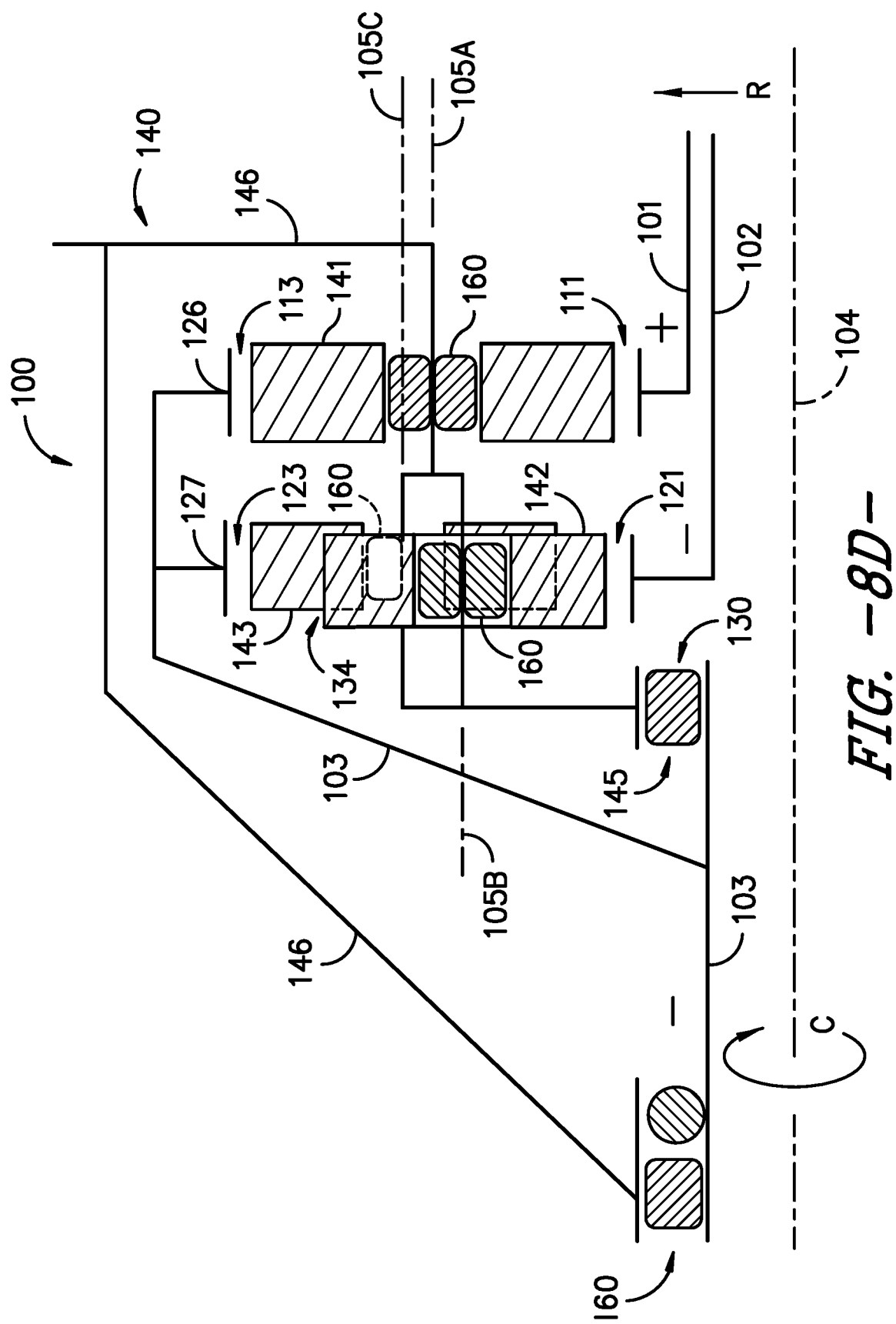
FIG. -8D-

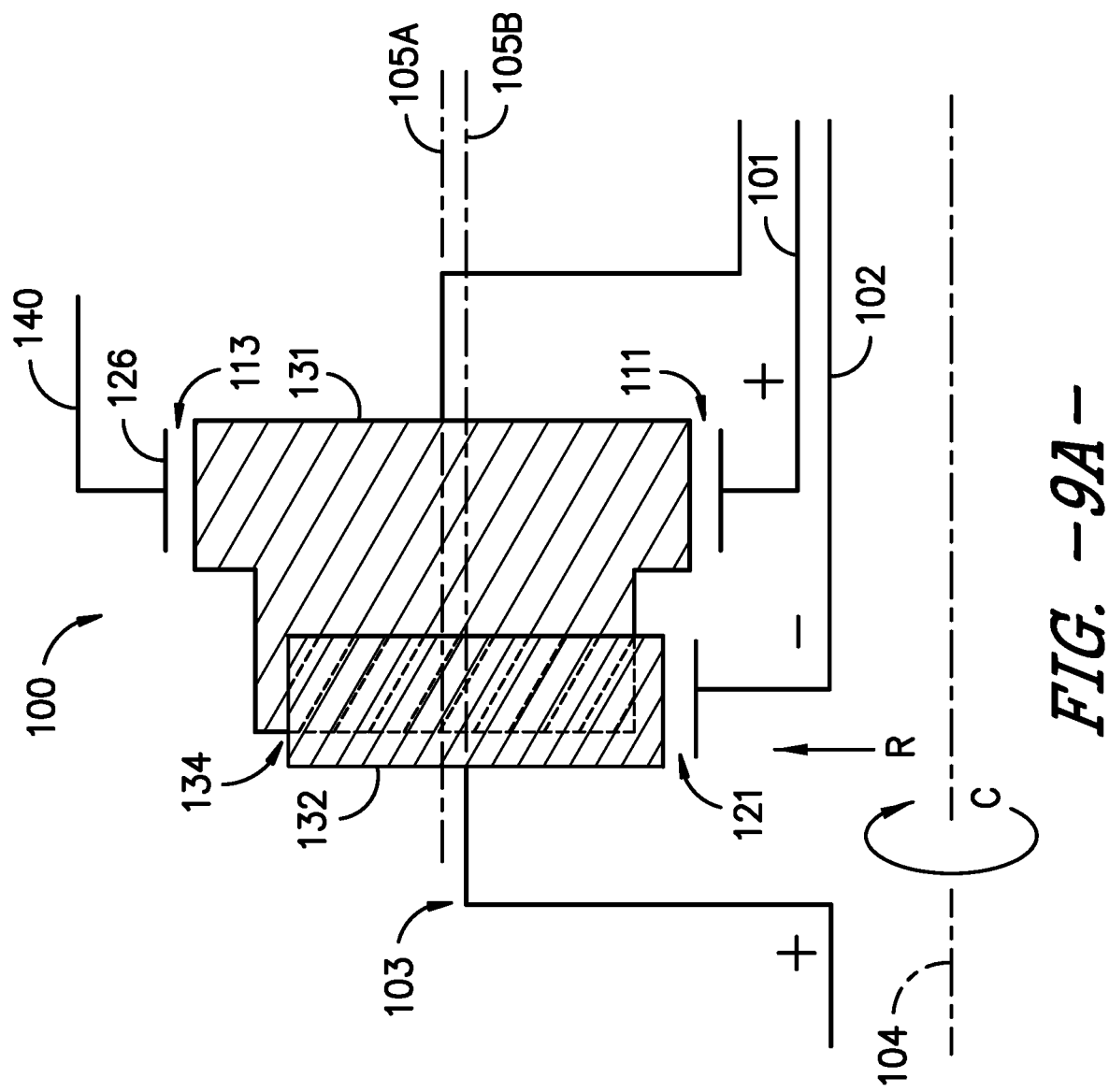
FIG. -9A-

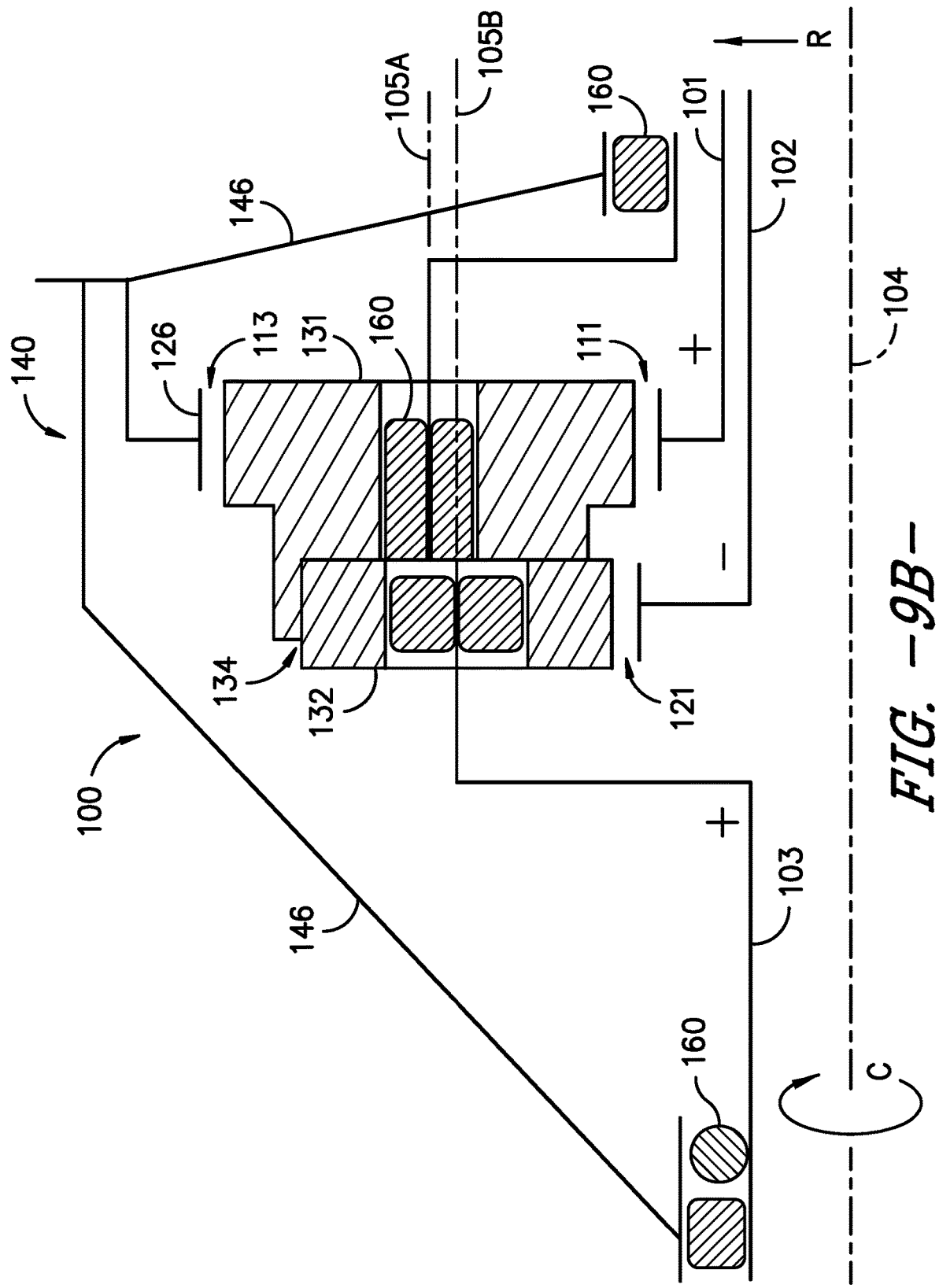
FIG. -9B-

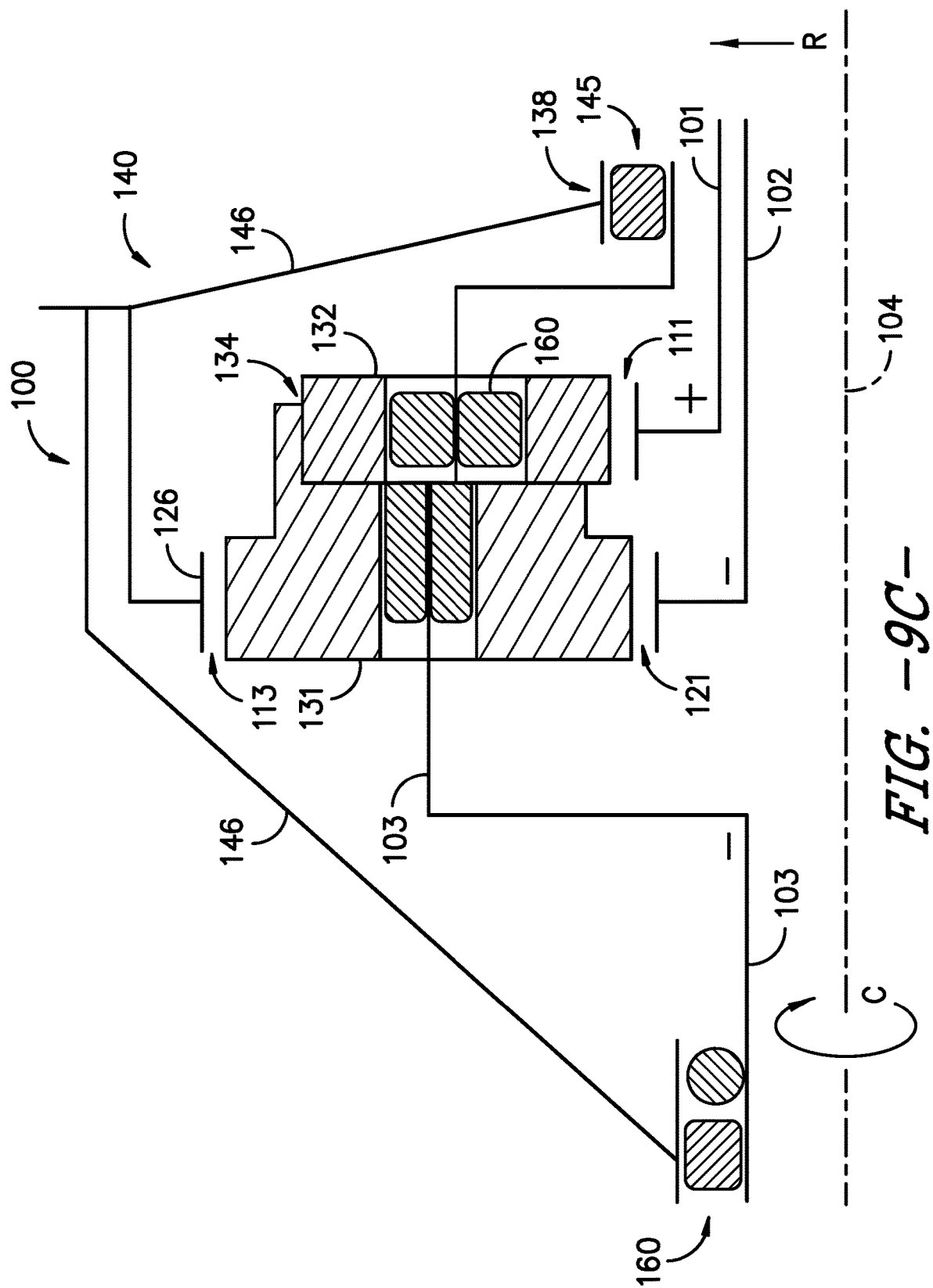

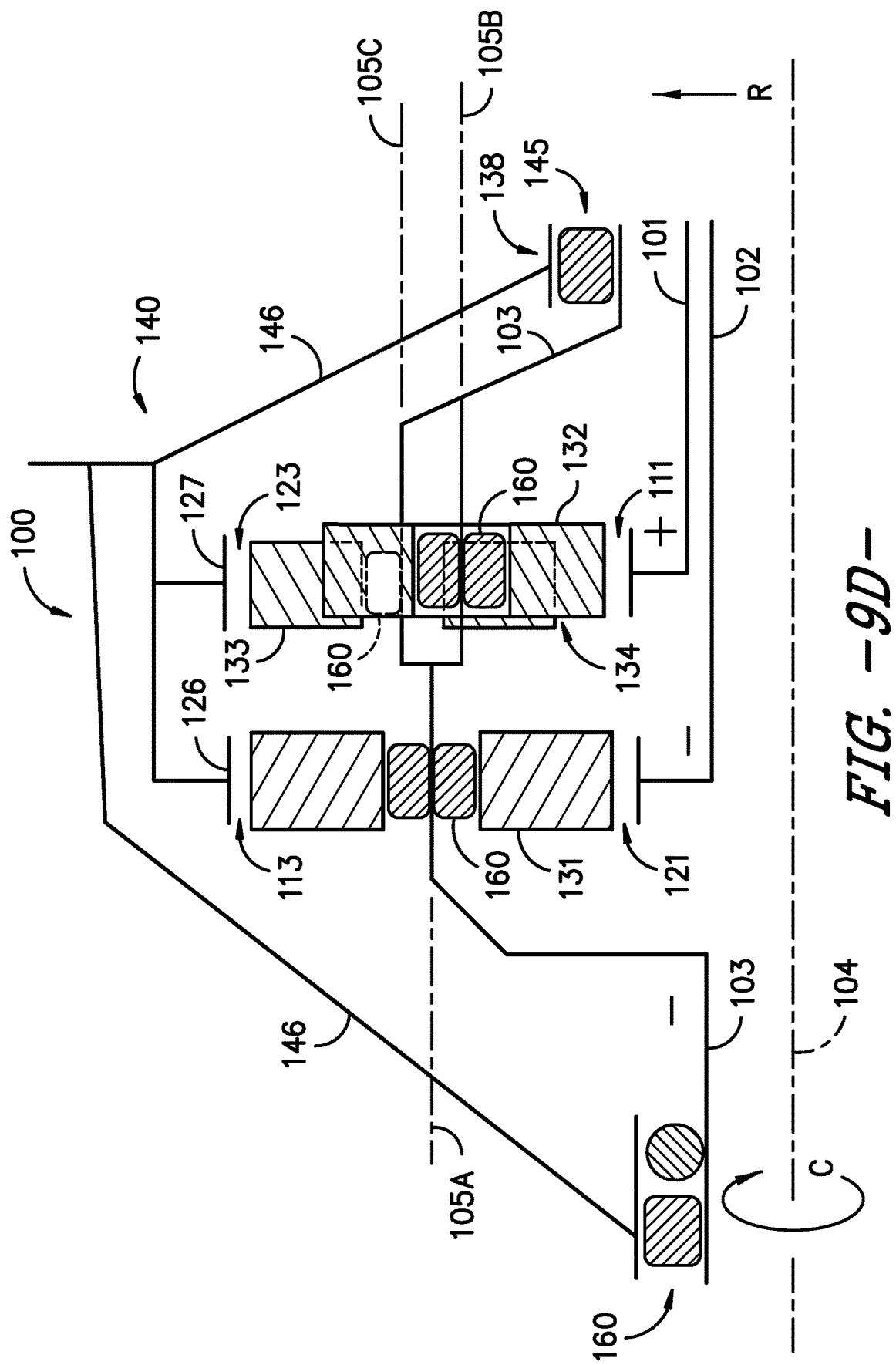
FIG. -9D-

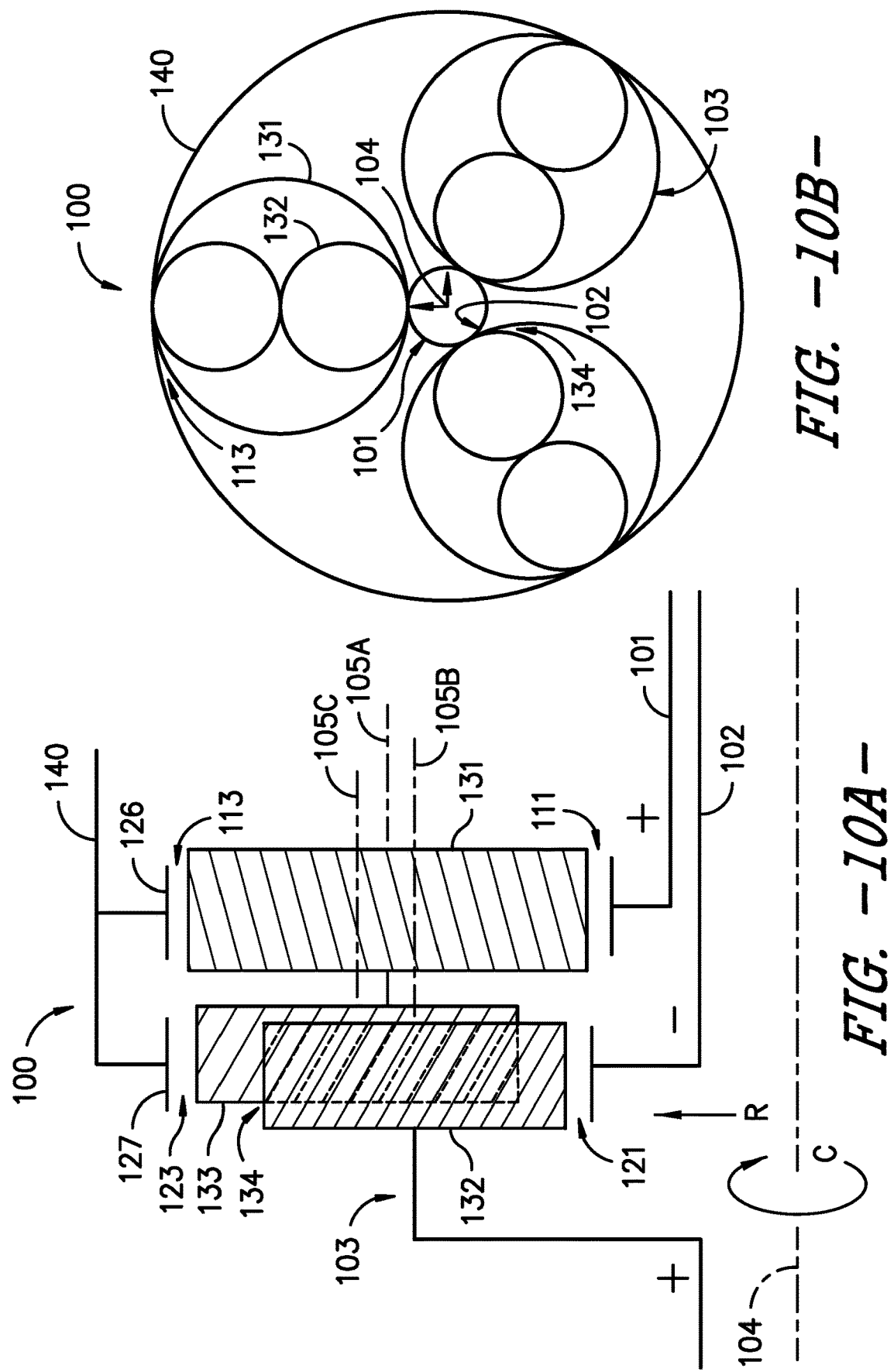

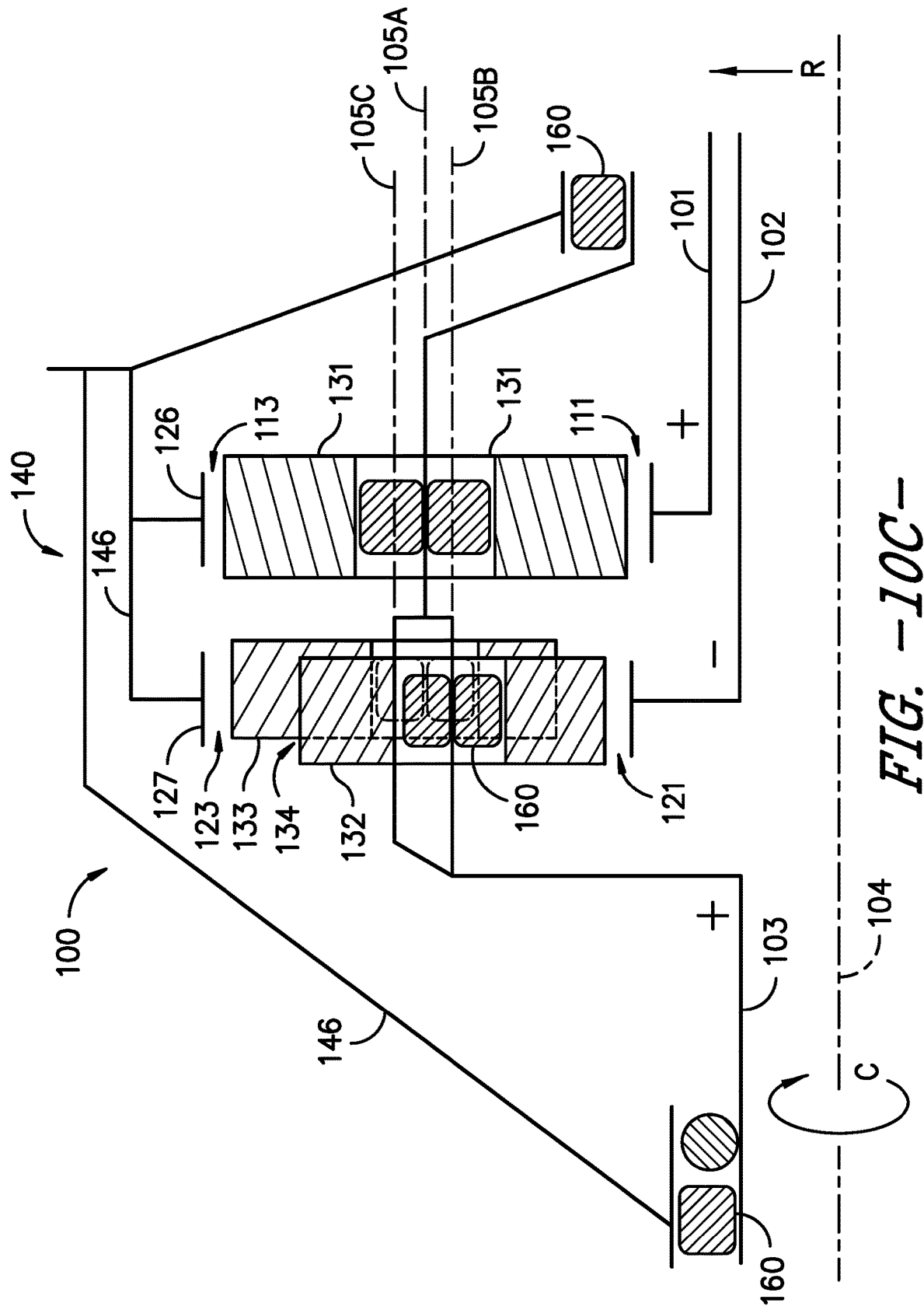
FIG. -10C-

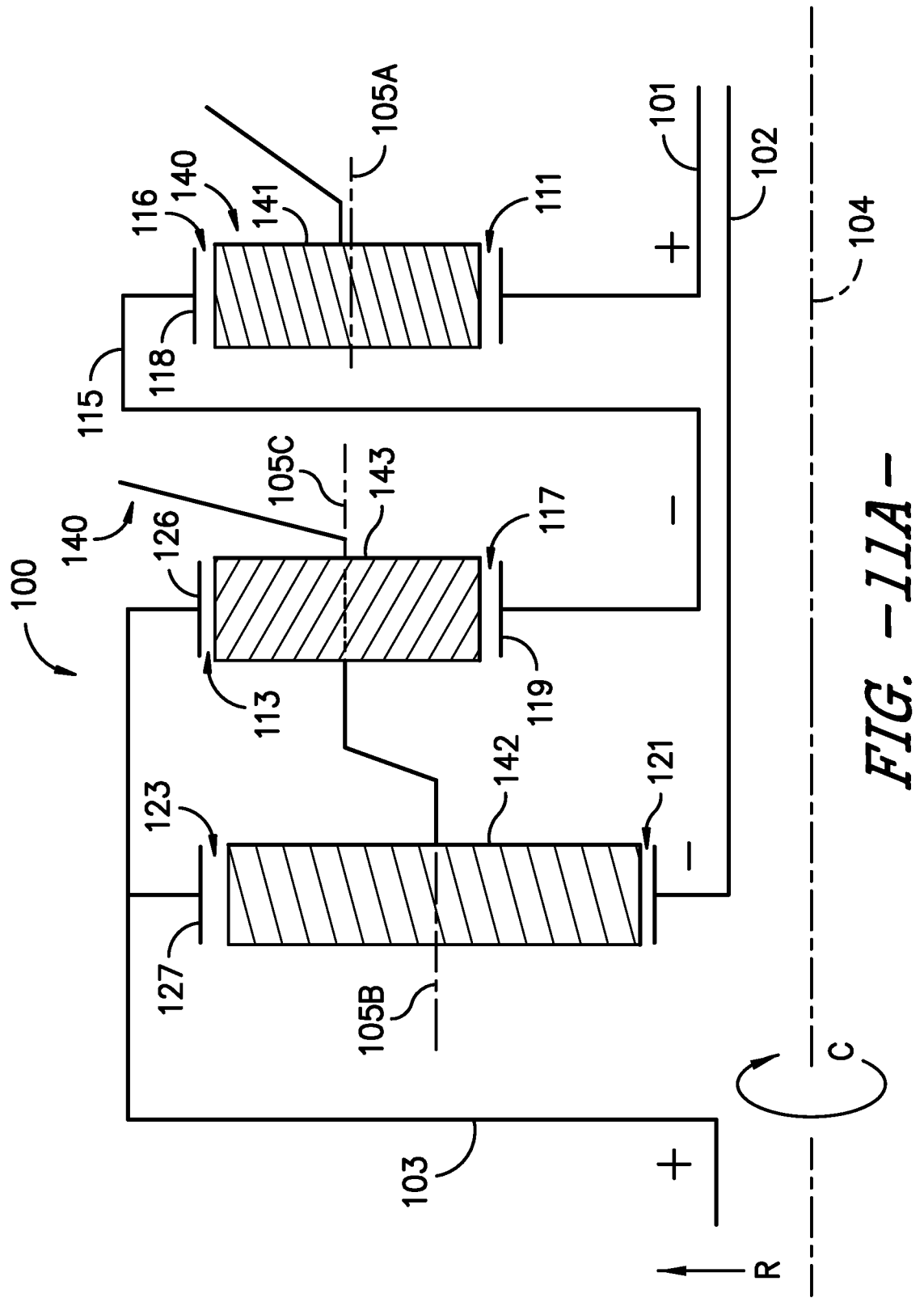
FIG. -11A-

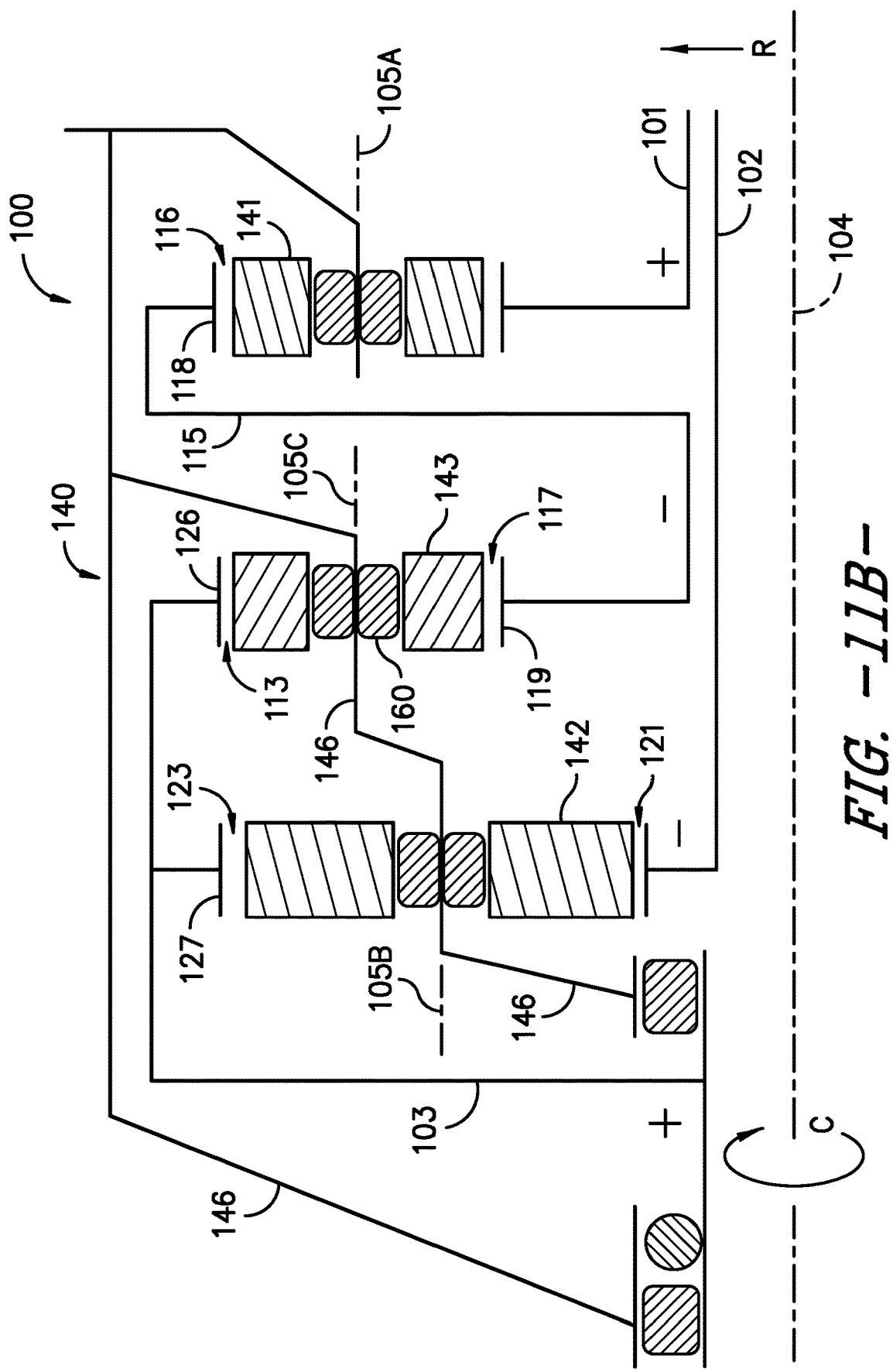
FIG. -11B-

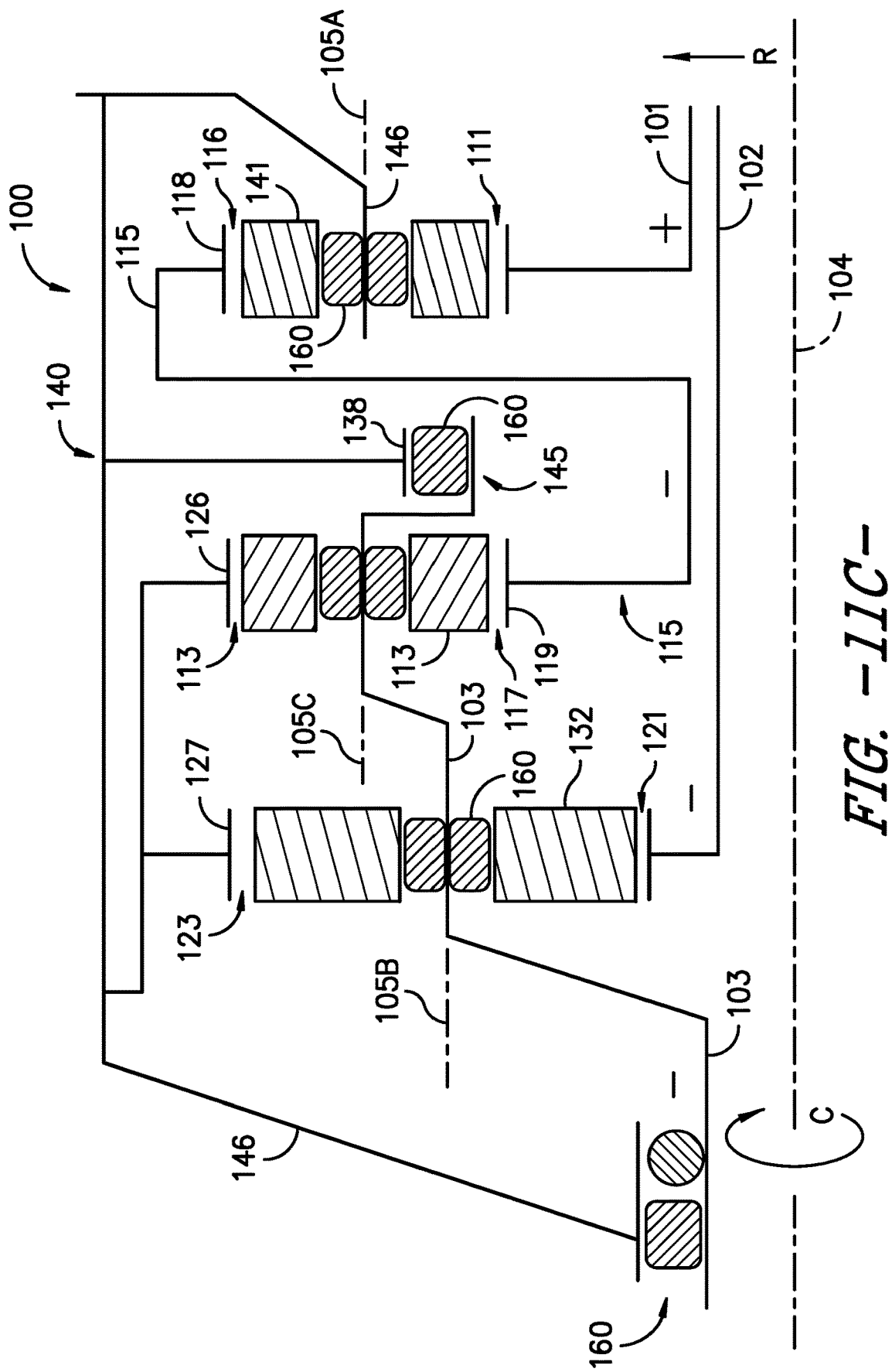
FIG. -11C-

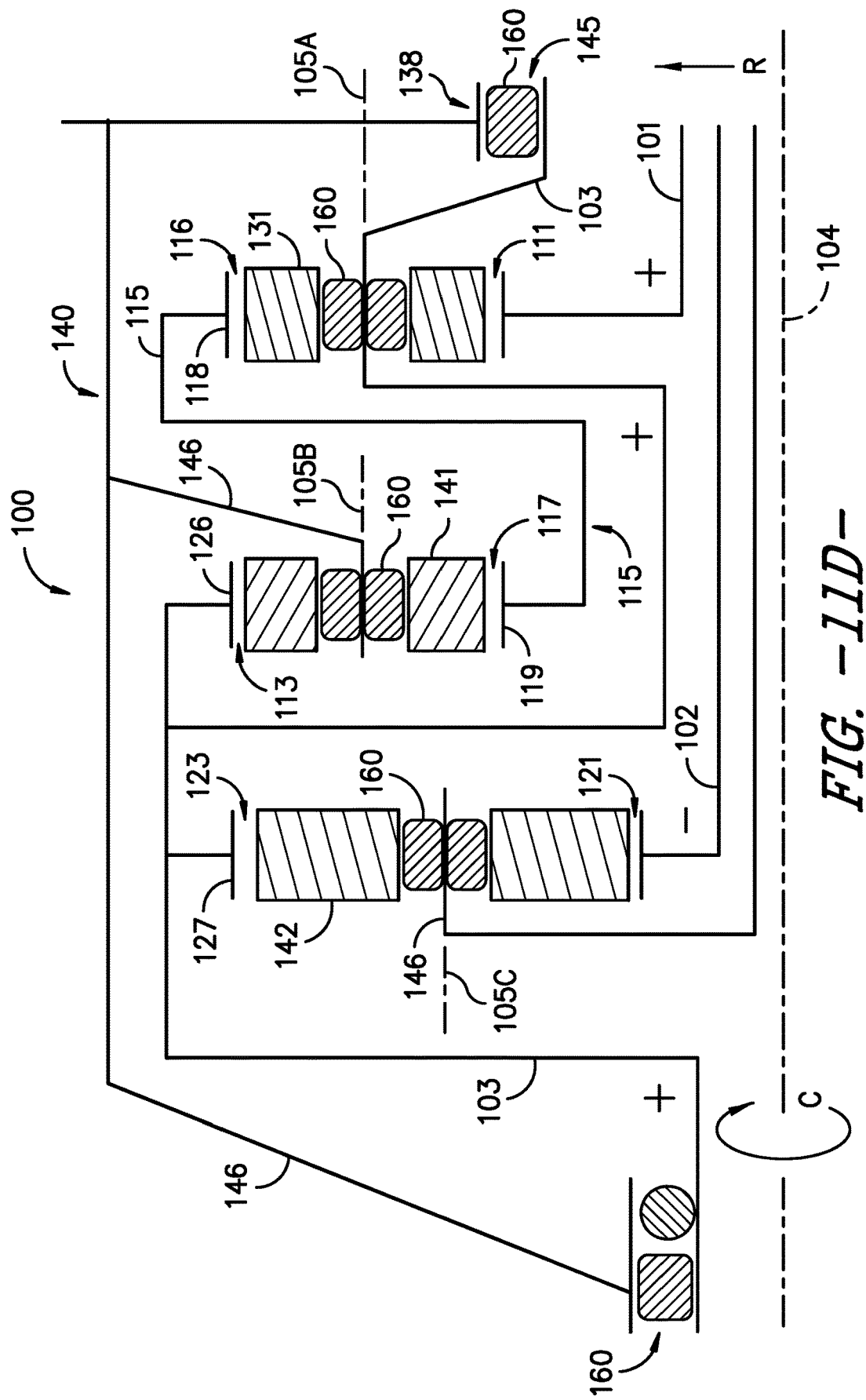
FIG. -11D-

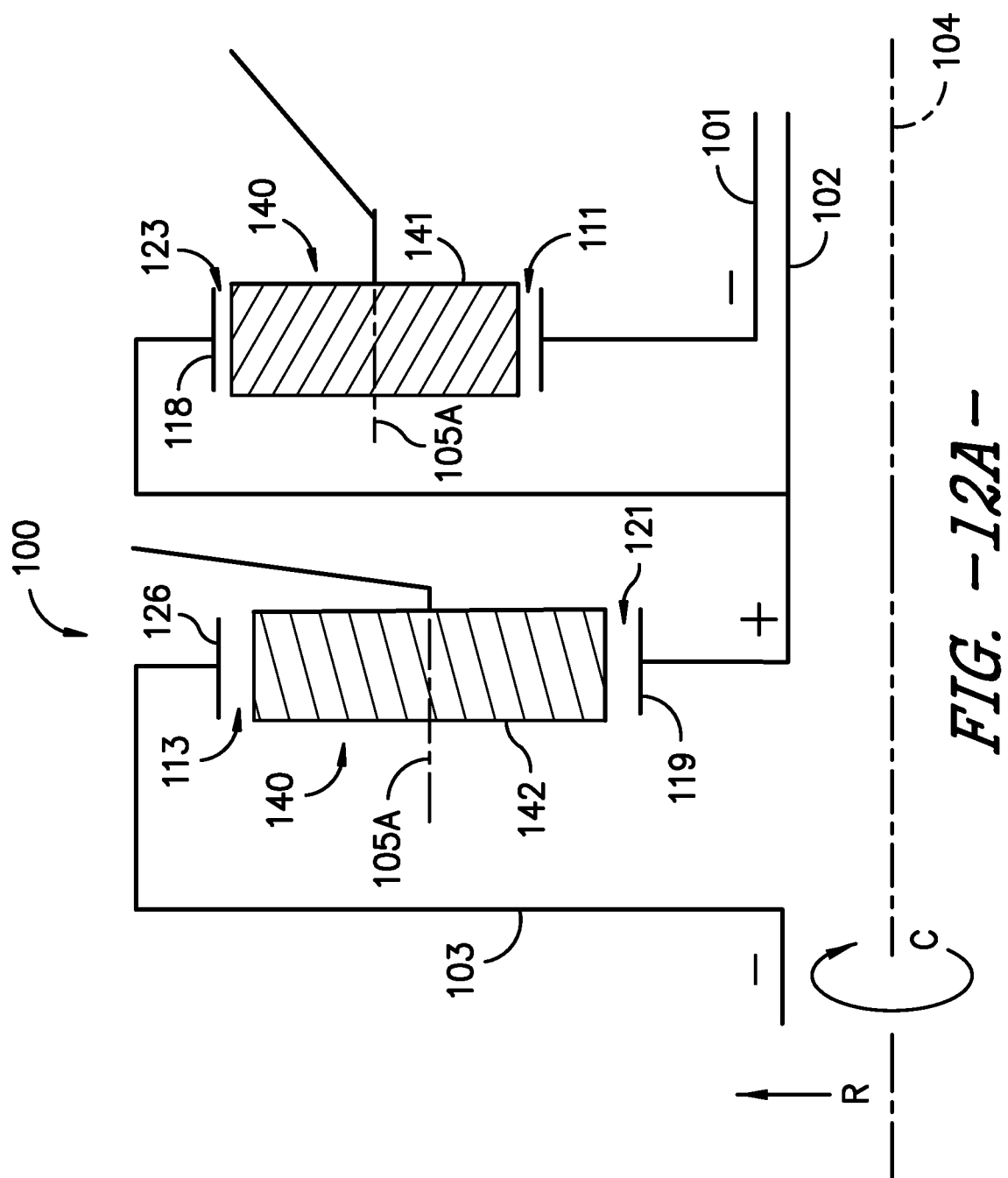
FIG. -12A-

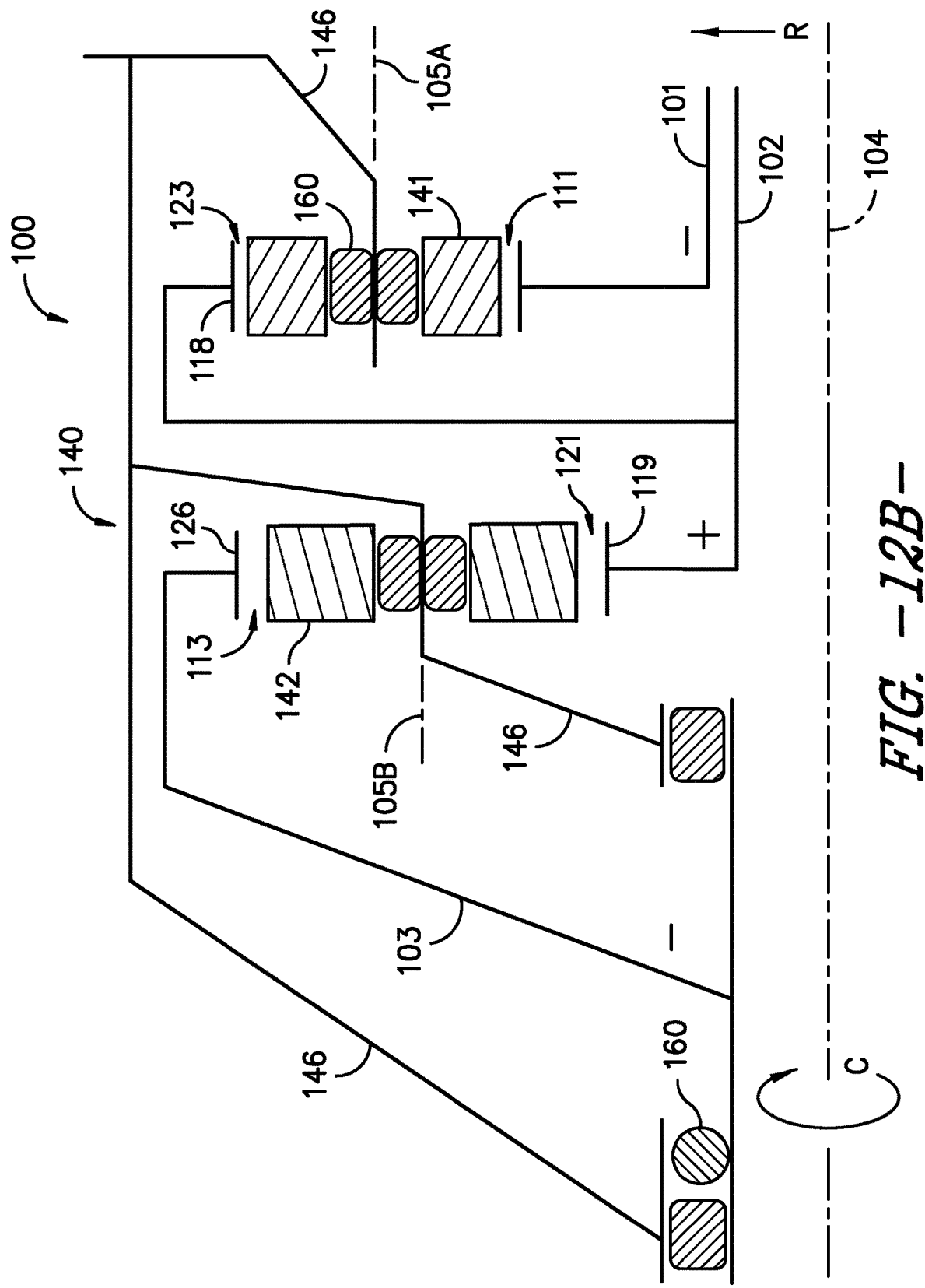

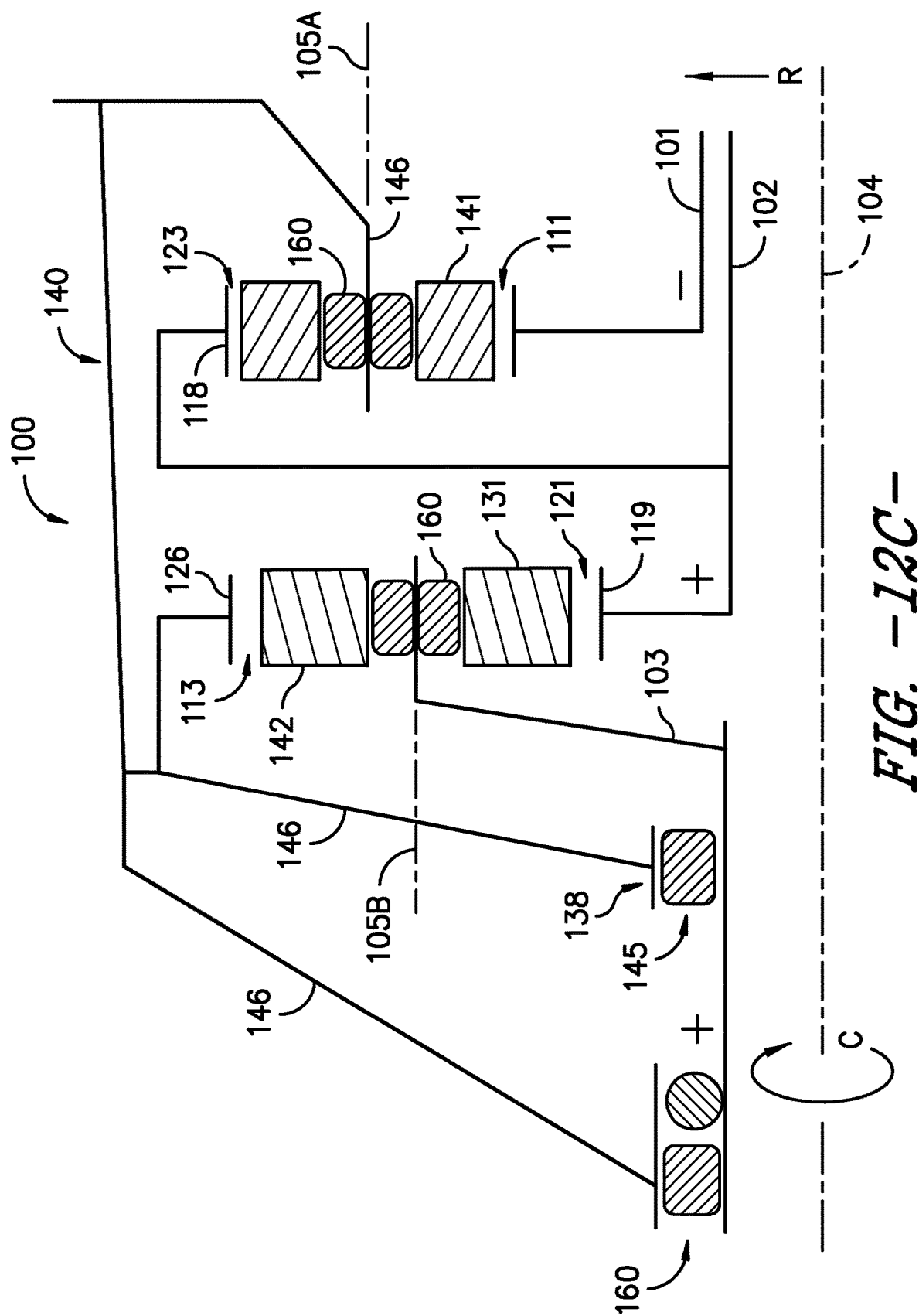
FIG. -12C-

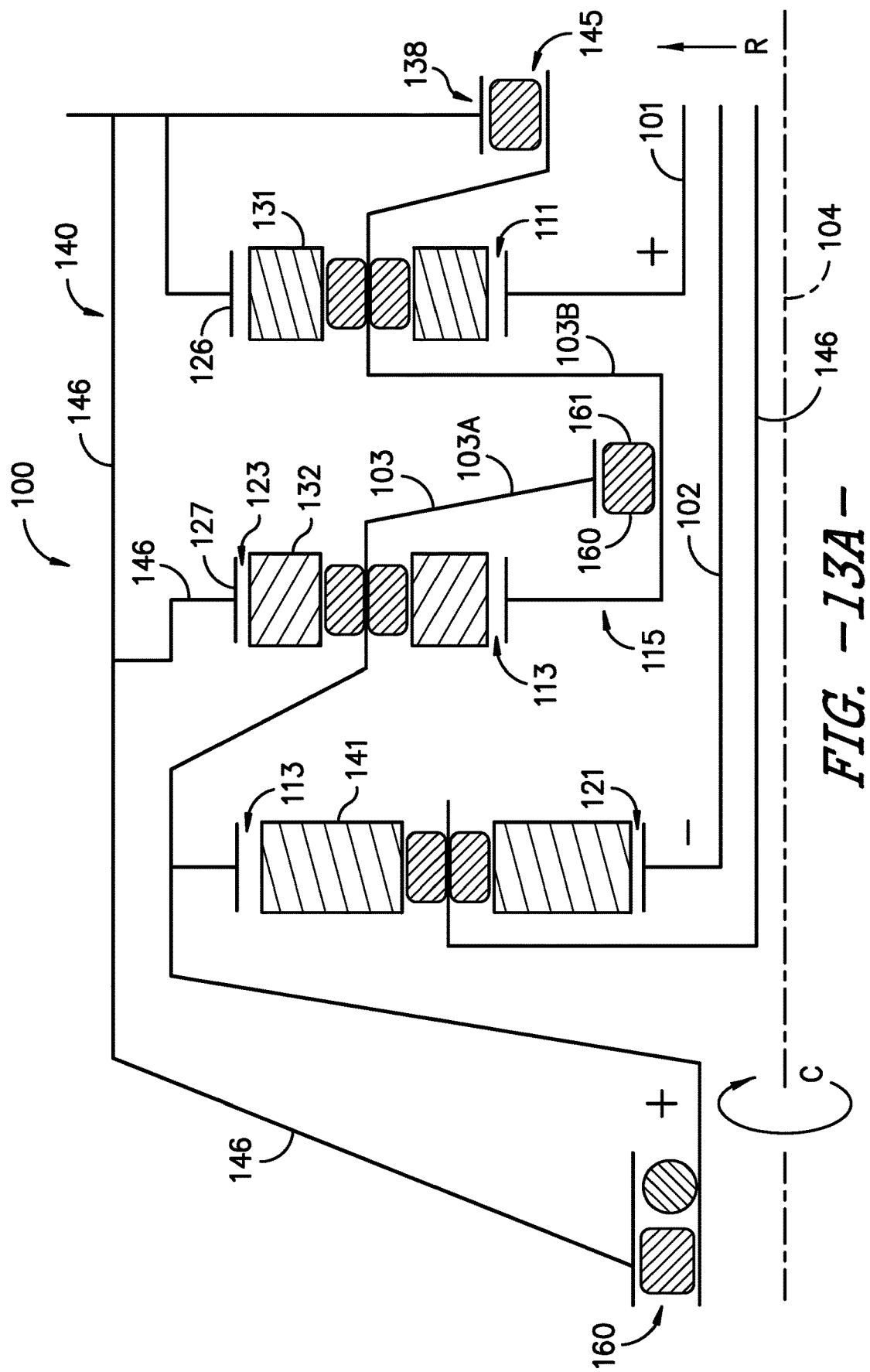
FIG. -13A-

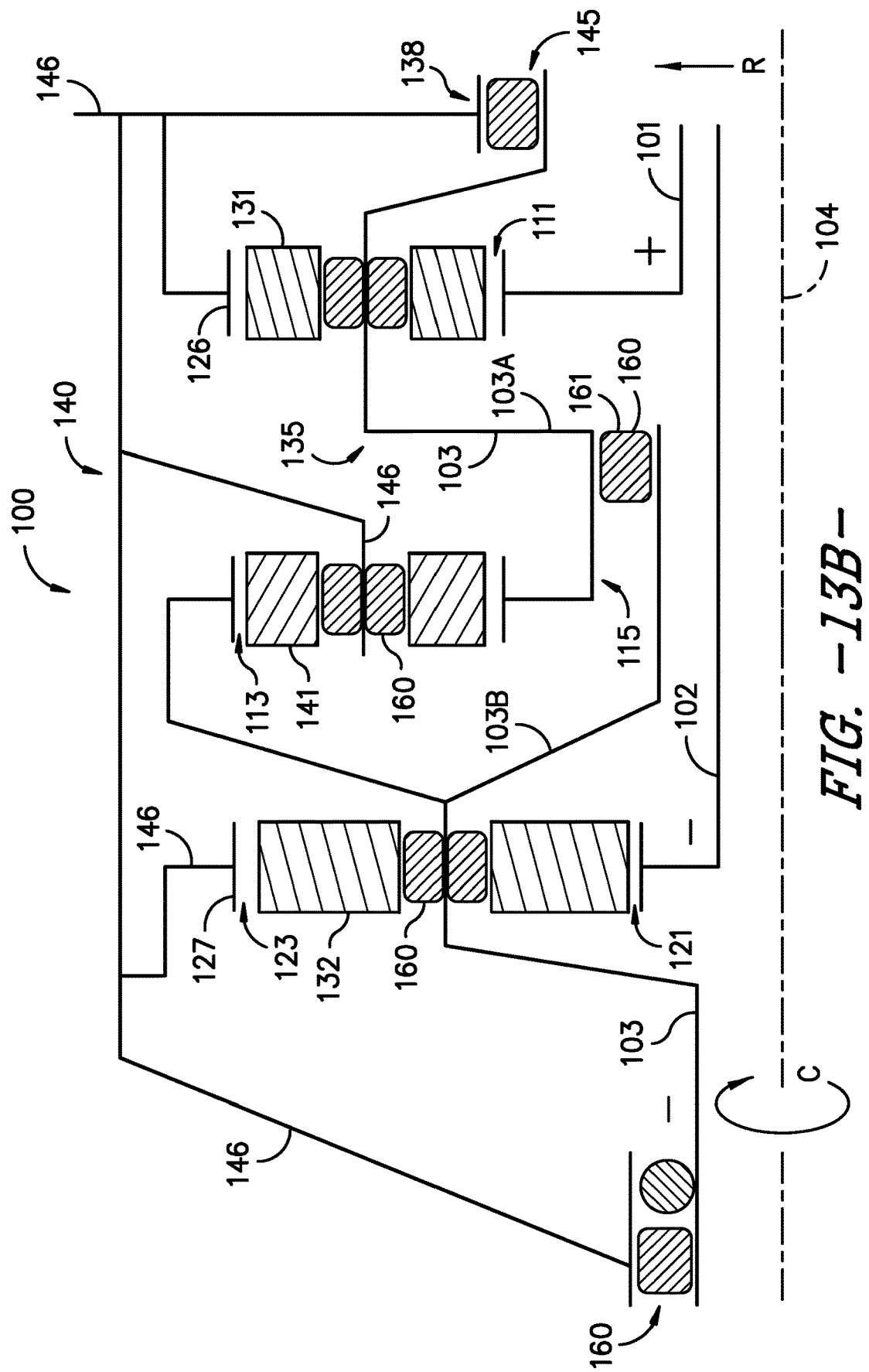
FIG. -13B-

TURBOMACHINE AND GEAR ASSEMBLY

CROSS-REFERENCE TO RELATED APPLICATIONS

This application is a continuation of U.S. patent application Ser. No. 17/150,136 filed on Jan. 15, 2021, which claims the benefit of Italian Patent Application No. 102020000000652 filed on Jan. 15, 2020, the contents of which are hereby incorporated by reference in their entireties.

GOVERNMENT SPONSORED RESEARCH

The project leading to this application has received funding from the Clean Sky 2 Joint Undertaking under the European Union's Horizon 2020 research and innovation program under grant agreement No. 807085-ENG GAM 2018-H2020-IBA-CS2-GAMS-2017/H2020-IBA-CS2-GAMS-2017.

FIELD

The present subject matter relates generally turbomachines including gear assemblies. The present subject matter relates particularly to gear assembly arrangements and gear assembly arrangements particular to certain turbomachine configurations.

BACKGROUND

A turbofan engine operates on the principle that a central gas turbine core drives a bypass fan, the bypass fan being located at a radial location between a nacelle of the engine and the engine core. With such a configuration, the engine is generally limited in a permissible size of the bypass fan, as increasing a size of the fan correspondingly increases a size and weight of the nacelle.

An open rotor engine, by contrast, operates on the principle of having the bypass fan located outside of the engine nacelle. This permits the use of larger rotor blades able to act upon a larger volume of air than for a traditional turbofan engine, potentially improving propulsive efficiency over conventional turbofan engine designs.

Turbomachines such as open rotor engines may require large gear ratios between the low speed spool and the fan rotor to permit the larger rotor blades to act upon a larger volume of air and/or to do so at certain desired operating speeds of the engine or aircraft. One challenge is that known gear assemblies may provide inadequate gear ratios for desired open rotor engine operation. For example, known gear assemblies may inadequately reduce the output rotational speed relative to the turbines, such that the fan rotor operates too fast and inefficient and/or the turbine operates too slow and inefficient. Another challenge is that known gear assemblies that may be scaled to provide adequate gear ratios may be too large for a desired length and/or diameter of the engine. Yet another challenge is that known gear assemblies may be inadequate for receiving multiple input shafts and/or counter-rotating input shafts. Therefore, inter-digitated compressor and/or turbine structures may be incompatible with certain known gear assemblies.

As such, there is a need for gear assemblies that may receive multiple input shafts, counter-rotating input shafts, provide desired gear ratios, and/or arrange within desired diametrical or length constraints, as may be suitable for turbomachines generally, or open rotor engines particularly.

BRIEF DESCRIPTION

Aspects and advantages of the invention will be set forth in part in the following description, or may be obvious from the description, or may be learned through practice of the invention.

A turbomachine engine according to an aspect of the present disclosure is provided. The engine includes a fan assembly including a plurality of fan blades, and a core engine surrounded by an outer casing. The core engine includes a power output component operably connected to the fan assembly, a first input power source and a second input power source. The first input power source is counter-rotatable relative to the second input power source. The core engine includes a gear assembly operably connected to the power output component and configured to receive power from the first input power source and the second input power source.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which:

FIG. 1 is a cutaway side view of an exemplary embodiment of a turbomachine engine including a core engine with a gear assembly according to an aspect of the present disclosure;

FIG. 2A is an exemplary schematic embodiment of a core engine according to an aspect of the present disclosure;

FIG. 2B is an exemplary schematic embodiment of a core engine according to an aspect of the present disclosure;

FIG. 3A is a schematic layout of an exemplary gear assembly according to an aspect of the present disclosure;

FIG. 3B is a schematic layout of an exemplary gear assembly according to an aspect of the present disclosure;

FIG. 4A is a schematic layout of a portion of an exemplary gear assembly according to an aspect of the present disclosure;

FIG. 4B is a schematic layout of an exemplary gear assembly including the exemplary embodiment of FIG. 4A;

FIG. 5 is a schematic layout of a portion of an exemplary gear assembly according to an aspect of the present disclosure;

FIGS. 6A-6B are schematic layouts of a portion of an exemplary gear assembly according to aspects of the present disclosure;

FIGS. 7A-7B are schematic layouts of a portion of an exemplary gear assembly according to aspects of the present disclosure;

FIGS. 8A-8D are schematic layouts of a portion of an exemplary gear assembly according to aspects of the present disclosure;

FIGS. 9A-9D are schematic layouts of a portion of an exemplary gear assembly according to aspects of the present disclosure;

FIGS. 10A-10C are schematic layouts of a portion of an exemplary gear assembly according to aspects of the present disclosure;

FIGS. 11A-11D are schematic layouts of a portion of an exemplary gear assembly according to aspects of the present disclosure; and FIGS. 12A-12C are schematic layouts of a portion of an exemplary gear assembly according to aspects of the present disclosure;

FIGS. 13A-13B are schematic layouts of a portion of an exemplary gear assembly according to aspects of the present disclosure.

Repeat use of reference characters in the present specification and drawings is intended to represent the same or analogous features or elements of the present invention.

DETAILED DESCRIPTION

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

The word "exemplary" is used herein to mean "serving as an example, instance, or illustration." Any implementation described herein as "exemplary" is not necessarily to be construed as preferred or advantageous over other implementations.

As used herein, the terms "first", "second", and "third" may be used interchangeably to distinguish one component from another and are not intended to signify location or importance of the individual components.

The terms "forward" and "aft" refer to relative positions within a gas turbine engine or vehicle, and refer to the normal operational attitude of the gas turbine engine or vehicle. For example, with regard to a gas turbine engine, forward refers to a position closer to an engine inlet and aft refers to a position closer to an engine nozzle or exhaust.

The terms "upstream" and "downstream" refer to the relative direction with respect to fluid flow in a fluid pathway. For example, "upstream" refers to the direction from which the fluid flows, and "downstream" refers to the direction to which the fluid flows.

The terms "coupled," "fixed," "attached to," and the like refer to both direct coupling, fixing, or attaching, as well as indirect coupling, fixing, or attaching through one or more intermediate components or features, unless otherwise specified herein.

The singular forms "a", "an", and "the" include plural references unless the context clearly dictates otherwise.

Approximating language, as used herein throughout the specification and claims, is applied to modify any quantitative representation that could permissibly vary without resulting in a change in the basic function to which it is related. Accordingly, a value modified by a term or terms, such as "about", "approximately", and "substantially", are not to be limited to the precise value specified. In at least some instances, the approximating language may correspond to the precision of an instrument for measuring the value, or the precision of the methods or machines for constructing or manufacturing the components and/or systems. For example, the approximating language may refer to being within a 1, 2, 4, 10, 15, or 20 percent margin.

Here and throughout the specification and claims, range limitations are combined and interchanged, such ranges are identified and include all the sub-ranges contained therein unless context or language indicates otherwise. For example, all ranges disclosed herein are inclusive of the endpoints, and the endpoints are independently combinable with each other.

One or more components of the turbomachine engine or gear assembly described hereinbelow may be manufactured or formed using any suitable process, such as an additive manufacturing process, such as a 3-D printing process. The use of such a process may allow such component to be formed integrally, as a single monolithic component, or as any suitable number of sub-components. In particular, the additive manufacturing process may allow such component to be integrally formed and include a variety of features not possible when using prior manufacturing methods. For example, the additive manufacturing methods described herein enable the manufacture of heat exchangers having unique features, configurations, thicknesses, materials, densities, fluid passageways, headers, and mounting structures that may not have been possible or practical using prior manufacturing methods. Some of these features are described herein.

As used herein, the terms "additively manufactured" or "additive manufacturing techniques or processes" refer generally to manufacturing processes wherein successive layers of material(s) are provided on each other to "build-up," layer-by-layer, a three-dimensional component. The successive layers generally fuse together to form a monolithic component which may have a variety of integral sub-components. Although additive manufacturing technology is described herein as enabling fabrication of complex objects by building objects point-by-point, layer-by-layer, typically in a vertical direction, other methods of fabrication are possible and within the scope of the present subject matter. For example, although the discussion herein refers to the addition of material to form successive layers, one skilled in the art will appreciate that the methods and structures disclosed herein may be practiced with any additive manufacturing technique or manufacturing technology. For example, embodiments of the present invention may use layer-additive processes, layer-subtractive processes, or hybrid processes.

Suitable additive manufacturing techniques in accordance with the present disclosure include, for example, Fused Deposition Modeling (FDM), Selective Laser Sintering (SLS), 3D printing such as by inkjets, laser jets, and binder jets, Sterolithography (SLA), Direct Selective Laser Sintering (DSLS), Electron Beam Sintering (EBS), Electron Beam Melting (EBM), Laser Engineered Net Shaping (LENS), Laser Net Shape Manufacturing (LNSM), Direct Metal Deposition (DMD), Digital Light Processing (DLP), Direct Selective Laser Melting (DSLM), Selective Laser Melting (SLM), Direct Metal Laser Melting (DMLM), and other known processes.

The additive manufacturing processes described herein may be used for forming components using any suitable material. For example, the material may be plastic, metal, concrete, ceramic, polymer, epoxy, photopolymer resin, or any other suitable material that may be in solid, liquid, powder, sheet material, wire, or any other suitable form or combinations thereof. More specifically, according to exemplary embodiments of the present subject matter, the additively manufactured components described herein may be formed in part, in whole, or in some combination of materials including but not limited to pure metals, nickel alloys, chrome alloys, titanium, titanium alloys, magnesium, magnesium alloys, aluminum, aluminum alloys, and nickel or cobalt based superalloys (e.g., those available under the name Inconel® available from Special Metals Corporation). These materials are examples of materials suitable for use in the additive manufacturing processes described herein, and may be generally referred to as "additive materials."

In addition, the additive manufacturing process disclosed herein allows a single component to be formed from multiple materials. Thus, the components described herein may be formed from any suitable mixtures of the above materials. For example, a component may include multiple layers, segments, or parts that are formed using different materials, processes, and/or on different additive manufacturing machines. In this manner, components may be constructed which have different materials and material properties for meeting the demands of any particular application. In addition, although the components described herein are constructed entirely by additive manufacturing processes, it should be appreciated that in alternate embodiments, all or a portion of these components may be formed via casting, machining, and/or any other suitable manufacturing process. Indeed, any suitable combination of materials and manufacturing methods may be used to form these components.

Notably, in exemplary embodiments, several features of the components described herein were previously not possible due to manufacturing restraints. However, the present inventors have advantageously utilized current advances in additive manufacturing techniques to develop exemplary embodiments of such components generally in accordance with the present disclosure. While the present disclosure is not limited to the use of additive manufacturing to form these components generally, additive manufacturing does provide a variety of manufacturing advantages, including ease of manufacturing, reduced cost, greater accuracy, etc.

In this regard, utilizing additive manufacturing methods, even multi-part components may be formed as a single piece of continuous metal, and may thus include fewer subcomponents and/or joints compared to prior designs. The integral formation of these multi-part components through additive manufacturing may advantageously improve the overall assembly process. For example, the integral formation reduces the number of separate parts that must be assembled, thus reducing associated time and overall assembly costs. Additionally, existing issues with, for example, leakage, joint quality between separate parts, and overall performance may advantageously be reduced.

Referring now to the drawings, FIG. 1 is an exemplary embodiment of an engine 10 including a gear assembly according to aspects of the present disclosure. The engine 10 includes a fan assembly 14 driven by a core engine 16. In various embodiments, the core engine 16 is a Brayton cycle system configured to drive the fan assembly 14. The core engine 16 is shrouded, at least in part, by an outer casing 18. The fan assembly 14 includes a plurality of fan blades 13. A vane assembly 20 is extended from the outer casing 18. The vane assembly 20 including a plurality of vanes 15 is positioned in operable arrangement with the fan blades 13 to provide thrust, control thrust vector, abate or re-direct undesired acoustic noise, or otherwise desirably alter a flow of air relative to the fan blades 13. In some embodiments, the fan assembly 14 includes between three (3) and twenty (20) fan blades 13. In certain embodiments, the vane assembly 20 includes an equal or fewer quantity of vanes 15 to fan blades 13.

In certain embodiments, such as depicted in FIG. 1, the vane assembly 20 is positioned downstream or aft of the fan assembly 14. However, it should be appreciated that in some embodiments, the vane assembly 20 may be positioned upstream or forward of the fan assembly 14. In still various embodiments, the engine 10 may include a first vane assembly positioned forward of the fan assembly 14 and a second vane assembly positioned aft of the fan assembly 14. The fan assembly 14 may be configured to desirably adjust pitch at one or more fan blades 13, such as to control thrust vector, abate or re-direct noise, or alter thrust output. The vane assembly 20 may be configured to desirably adjust pitch at one or more vanes 15, such as to control thrust vector, abate or re-direct noise, or alter thrust output. Pitch control mechanisms at one or both of the fan assembly 14 or the vane assembly 20 may co-operate to produce one or more desired effects described above.

In certain embodiments, such as depicted in FIG. 1, the engine 10 is an unducted thrust producing system, such that the plurality of fan blades 13 is unshrouded by a nacelle or fan casing. As such, in various embodiments, the engine 10 may be configured as an unshrouded turbofan engine, an open rotor engine, or a propfan engine. In particular embodiments, the engine 10 is a single unducted rotor engine including a single row of fan blades 13. The engine 10 configured as an open rotor engine includes the fan assembly 14 having large-diameter fan blades 13, such as may be suitable for high bypass ratios, high cruise speeds (e.g., comparable to aircraft with turbofan engines, or generally higher cruise speed than aircraft with turboprop engines), high cruise altitude (e.g., comparable to aircraft with turbofan engines, or generally high cruise speed than aircraft with turboprop engines), and/or relatively low rotational speeds. Cruise altitude is generally an altitude at which an aircraft levels after climb and prior to descending to an approach flight phase. In various embodiments, the engine is applied to a vehicle with a cruise altitude up to approximately 65,000 ft. In certain embodiments, cruise altitude is between approximately 28,000 ft and approximately 45,000 ft. In still certain embodiments, cruise altitude is expressed in flight levels based on a standard air pressure at sea level, in which a cruise flight condition is between FL280 and FL650. In another embodiment, cruise flight condition is between FL280 and FL450. In still certain embodiments, cruise altitude is defined based at least on a barometric pressure, in which cruise altitude is between approximately 4.85 psia and approximately 0.82 psia based on a sea level pressure of approximately 14.70 psia and sea level temperature at approximately 59 degree Fahrenheit. In another embodiment, cruise altitude is between approximately 4.85 psia and approximately 2.14 psia. It should be appreciated that in certain embodiments, the ranges of cruise altitude defined by pressure may be adjusted based on a different reference sea level pressure and/or sea level temperature.

The core engine 16 is generally encased in outer casing 18 defining a maximum diameter. In certain embodiments, the engine 10 includes a length from a longitudinally forward end 98 to a longitudinally aft end 99. In various embodiments, the engine 10 defines a ratio of length (L) to maximum diameter ($D_{max}$) that provides for reduced installed drag. In one embodiment, $L/D_{max}$ is at least 2. In another embodiment, $L/D_{max}$ is at least 2.5. In various embodiments, it should be appreciated that the $L/D_{max}$ is for a single unducted rotor engine.

The reduced installed drag may further provide for improved efficiency, such as improved specific fuel consumption. Additionally, or alternatively, the reduced drag may provide for cruise altitude engine and aircraft operation at or above Mach 0.5. In certain embodiments, the $L/D_{max}$, the fan assembly 14, and/or the vane assembly 20 separately or together configure, at least in part, the engine 10 to operate at a maximum cruise altitude operating speed between approximately Mach 0.55 and approximately Mach 0.85.

Referring now to FIGS. 2A-2B, exemplary embodiments of the core engine 16 are provided. The core engine 16 includes a compressor section 21, a heat addition system 26, and an expansion section 33 together in serial flow arrangement. The core engine 16 is extended circumferentially relative to an engine centerline axis 12. The core engine 16 includes a high-speed spool that includes a high-speed compressor 24 and a high-speed turbine 28 operably rotatably coupled together by a high-speed shaft 27. The heat addition system 26 is positioned between the high-speed compressor 24 and the high-speed turbine 28. Various embodiments of the heat addition system 26 include a combustion section. The combustion section may be configured as a deflagrative combustion section, a rotating detonation combustion section, a pulse detonation combustion section, or other appropriate heat addition system. The heat addition system 26 may be configured as one or more of a rich-burn system or a lean-burn system, or combinations thereof. In still various embodiments, the heat addition system 26 includes an annular combustor, a can combustor, a cannular combustor, a trapped vortex combustor (TVC), or other appropriate combustion system, or combinations thereof.

Referring still to FIGS. 2A-2B, the core engine 16 includes a booster or low-speed compressor 22 positioned in flow relationship with the high-speed compressor 24. The low-speed compressor 22 is rotatably coupled with a first turbine 30 via a first shaft 29. Various embodiments of the expansion section 33 further include a second turbine 32 rotatably coupled to a second shaft 31. The first turbine 30 and the second turbine 32 are each operably connected to a gear assembly 100 to provide power to the fan assembly 14, such as described further herein.

It should be appreciated that the terms "low" and "high", or their respective comparative degrees (e.g., -er, where applicable), when used with compressor, turbine, shaft, or spool components, each refer to relative speeds within an engine unless otherwise specified. For example, a "low turbine" or "low speed turbine" defines a component configured to operate at a rotational speed, such as a maximum allowable rotational speed, lower than a "high turbine" or "high speed turbine" at the engine. Alternatively, unless otherwise specified, the aforementioned terms may be understood in their superlative degree. For example, a "low turbine" or "low speed turbine" may refer to the lowest maximum rotational speed turbine within a turbine section, a "low compressor" or "low speed compressor" may refer to the lowest maximum rotational speed turbine within a compressor section, a "high turbine" or "high speed turbine" may refer to the highest maximum rotational speed turbine within the turbine section, and a "high compressor" or "high speed compressor" may refer to the highest maximum rotational speed compressor within the compressor section. Similarly, the low speed spool refers to a lower maximum rotational speed than the high speed spool. It should further be appreciated that the terms "low" or "high" in such aforementioned regards may additionally, or alternatively, be understood as relative to minimum allowable speeds, or minimum or maximum allowable speeds relative to normal, desired, steady state, etc. operation of the engine.

In certain embodiments, such as depicted in FIG. 2B, the core engine 16 includes one or more interdigitated structures at the compressor section 21 and/or the expansion section 33. In one embodiment, the expansion section 33 includes the second turbine 32 interdigitated with the first turbine 30, such as via a rotating outer shroud, drum, casing, or rotor. Although not depicted, it should be appreciated that embodiments of the expansion section 33 may include the first and/or second turbine 30, 32 interdigitated with one or more stages of the high-speed turbine 28. In another embodiment, the compressor section 21 includes the low-speed compressor 22 interdigitated with the high-speed compressor 24.

Referring now to FIG. 1 and FIGS. 2A-2B, the core engine 16 includes the gear assembly 100 (FIGS. 2A-2B) configured to transfer power from the expansion section 33 and reduce an output rotational speed at the fan assembly 14 relative to one or both turbines 30, 32 (FIGS. 2A-2B). Embodiments of the gear assembly 100 depicted and described in regard to FIGS. 3A-13B may allow for gear ratios suitable for large-diameter unducted fans and relatively small-diameter and/or relatively high-speed turbines, such as turbines 30, 32 (FIGS. 2A-2B). Additionally, embodiments of the gear assembly 100 provided herein may be suitable within the radial or diametrical constraints of the core engine 16 within the outer casing 18.

Embodiments of the gear assembly 100 depicted and described in regard to FIGS. 3A-13B may provide for gear ratios and arrangements that fit within the $L/D_{max}$ constraints of the engine 10. In certain embodiments, the gear assembly 100 depicted and described in regard to FIGS. 3A-13B allow for gear ratios and arrangements providing for rotational speed of the fan assembly 14 corresponding to one or more ranges of cruise altitude and/or cruise speed provided above. Various embodiments of the gear assembly 100 provided herein may allow for gear ratios of up to 14:1. Still various embodiments of the gear assembly 100 provided herein may allow for gear ratios of at least 4:1. Still yet various embodiments of the gear assembly 100 provided herein allow for gear ratios between 4:1 to 12:1 for a two-stage epicyclic gear assembly or compound gear assembly. It should be appreciated that embodiments of the gear assembly 100 provided herein may allow for large gear ratios such as provided herein between the expansion section 33 and the fan assembly 14, or particularly between a first turbine 30 (FIGS. 2A-2B) and the fan assembly 14 and/or between a second turbine 32 (FIGS. 2A-2B) and the fan assembly 14, and within constraints such as, but not limited to, length (L) of the engine 10, maximum diameter ($D_{max}$) of the engine 10, cruise altitude of up to 65,000 ft, and/or operating cruise speed of up to Mach 0.85, or combinations thereof.

Although depicted as an un-shrouded or open rotor engine, it should be appreciated that aspects of the disclosure provided herein may be applied to shrouded or ducted engines, partially ducted engines, aft-fan engines, or other turbomachine configurations, including those for marine, industrial, or aero-propulsion systems. Certain aspects of the disclosure may be applicable to turbofan, turboprop, or turboshaft engines. However, it should be appreciated that certain aspects of the disclosure may address issues that may be particular to un-shrouded or open rotor engines, such as, but not limited to, issues related to gear ratios, fan diameter, fan speed, length (L) of the engine 10, maximum diameter ($D_{max}$) of the engine 10, $L/D_{max}$ of the engine 10, desired cruise altitude, and/or desired operating cruise speed, or combinations thereof.

Referring to FIGS. 3A-13B, schematic embodiments of a gear assembly 100 operably connected to a first power input source 101 and a second power input source 102 are provided. Embodiments of the gear assembly 100 receive power or torque from the first power input source 101 and the second power input source 102. In various embodiments, the first and second power input sources 101, 102 include engine shafts that are rotatably independent of one another. In one embodiment, the first power input source 101 is the first shaft 29 (FIGS. 2A-2B) and the second power input source 102 is second shaft 31 (FIGS. 2A-2B). As such, in certain embodiments, the gear assembly 100 is configured to receive power or torque from a first turbine (e.g., first turbine 30 in FIGS. 2A-2B) and a second turbine (e.g., second turbine 32 in FIGS. 2A-2B). Still further, in certain embodiments, the first turbine and the second turbine are rotatably independent of another, such that rotation of one turbine does not necessarily induce rotation of the other turbine.

The first power input source 101 and the second power input source 102 may generally include coaxial counter-rotating shafts with respect to one another, such as indicated by "+" and "−" in FIGS. 3A-13B. The first power input source 101 may generally be coupled to a higher speed spool than the second power input source 102. As such, the first power input source 101 is generally rotatable at a higher speed than the second power input source 102. Furthermore, the gear assembly 100 is configured to receive the first power input source 101 at a higher rotational speed than the second power input source 102.

Referring still to FIGS. 3A-13B, the gear assembly 100 includes a static component assembly 140 fixed relative to a gear assembly centerline axis 104, such as fixed along a circumferential direction C relative to the gear assembly centerline axis 104. The static component assembly 140 is operably connected to receive power or torque from the first power input source 101. The static component assembly 140 is further operably connected to receive power or torque from the second power input source 102. In various embodiments such as depicted and described in regard to FIGS. 3A-13B, the static component assembly 140 includes one or more gears, such as a first gear 141 and a second gear 142 depicted and described herein. The gears (e.g., gears 141, 142, 143, etc.) are fixed relative to the gear assembly centerline axis 104. The gears each include a component centerline axis (e.g., component centerline axis 105, 105A, 105B, 105C, etc.) with respect to each gear. In certain embodiments, each gear of the static component assembly 140 is rotatable around each respective component centerline axis while each component centerline axis is fixed relative to the gear assembly centerline axis 104.

In still certain embodiments, the power output component 103 includes gears (e.g., gears 131, 132, 133, etc.) circumferentially rotatable around the gear assembly centerline axis 104. The gears each include a component centerline axis with respect to each gear. In certain embodiments, such as depicted and described in regard to FIGS. 9, 10A-10B, each gear of the power output component 103 is rotatable around its respective component centerline axis while further being rotatable along the circumferential direction C relative to the gear assembly centerline axis 104.

In various embodiments, the static component assembly 140 includes a mount structure 146. In certain embodiments, the mount structure 146 includes frames, casings, mounts, static shafts, or other substantially fixed or grounded structures. Although not depicted in further detail, it should be appreciated that the mount structure 146 may include any one or more fixed structures of the engine 10 or turbomachines generally. In various embodiments, the mount structure 146 is an inlet casing at the fan assembly 14 or forward of the compressor section 21 (FIGS. 2A-2B), an intermediate case positioned between the low-speed compressor 22 and the high-speed compressor, or other fixed structure at the fan assembly 14, compressor section 21, or heat addition system 26. In still various embodiments, the mount structure 146 is a turbine casing or mid-turbine frame positioned at the expansion section 33, or other fixed structure aft or downstream of the expansion section 33, or other appropriate fixed structure at a turbomachine.

The gear assembly 100 is operably connected to transmit power or torque from the first and second power input sources 101, 102 to a power output component 103. In various embodiments, the power output component 103 is connected to a load device. In certain embodiments, the load device is a fan or propeller assembly (e.g., fan assembly 14 in FIGS. 1, 2A-2B), an electric machine, a rotary wing assembly (e.g., helicopter rotor), or other power output or propulsion device. In still certain embodiments, the power output component 103 includes a shaft driven at least in part by power received through the gear assembly 100 from the first and second turbines 30, 32. In various embodiments, the power output component 103 is configured to rotate co-directionally with either the first power input source 101 or the second power input source 102, such as indicated by "+" or "−" in FIGS. 3A-13B.

Referring still to FIGS. 3A-13B, various embodiments of the gear assembly 100 include bearings 160 connected to certain components described herein to allow for rotation about a component centerline axis, a gear assembly centerline axis, or both, such as further described herein. It should be appreciated that certain embodiments depicted and described herein may omit, for clarity, depictions of bearing placement and/or static structures to which the bearings may be fixed. In certain embodiments, bearings 160 are placed between the static component assembly 140 and one or more structures rotatable around the gear assembly centerline axis 104, including, but not limited to, the first input power source 101, the second input power source 102, the power output component 103, the gears 115, 131, 132, 133. In still certain embodiments, bearings 160 are placed between the static component assembly 140 and one or more structure rotatable relative to the component centerline axis 105, 105A, 105B, 105C, etc., including, but not limited to, the gears 141, 142, 143, etc. The bearing 160 may include any appropriate bearing type, or combinations thereof. It should be appreciated that one skilled in the art would reasonably ascertain without undue experimentation bearing assembly types (e.g., roller bearings, thrust bearings, journal bearings, fluid film bearings, etc.) that may be utilized to receive or transmit power, rotate certain structures relative to a desired axis, fix or mount certain structures relative to a desired axis, or otherwise arrange or operate the embodiments of the gear assembly 100 provided herein.

Referring still to FIGS. 3A-12B, it should be appreciated that some schematic embodiments provided herein are partially exploded, such that surfaces or interfaces may appear separated from adjacent structures. However, unless otherwise stated, interfaces or meshes depicted or described herein are operably coupled together, such as to desirably transfer power or torque between components or features described herein. Interfaces (e.g., interfaces 111, 113, 121, 123, 134, 145, etc.) depicted and described herein between rotary and/or fixed structures may include any appropriate gear type, gear mesh, spline, or other interface. It should be appreciated that one skilled in the art would reasonably ascertain without undue experimentation gear spline types (e.g., helical splines, serrations, crowned splines, parallel key splines, etc.) or gear types (e.g., helical, bi-helical, spur, etc.) that may be utilized to receive or transmit power, limit undesired vibrations or resonances, mitigate undesired wear or deterioration, or other considerations known in the art for gear interfaces.

Referring to FIGS. 3A-3B the static component assembly 140 includes a first input interface 111 at which the first power input source 101 is connected. The static component assembly 140 further includes a second input interface 121 at which the second power input source 102 is connected. In various embodiments, the first and second input interfaces 111, 121 each include a gear mesh or splined interface or other appropriate interface to couple together the sources 101, 102 to the static component assembly 140.

The static component assembly 140 is operably connected to the power output component 103. The gear assembly 100 includes a first output interface 113 and a second output interface 123. Each output interface 113, 123 is operably connected to the power output component 103 to provide power or torque from the power input sources 101, 102. In certain embodiments, the static component assembly 140 includes a first gear 141 and a second gear 142. The static component assembly 140 is coupled to the first input power source 101 at the first interface 111. The static component assembly 140 is coupled to the second input power source 102 at the second interface 121.

In certain embodiments, the static component assembly 140 includes a first component 110 at which the first gear 141 is positioned and a second component 120 at which the second gear 142 is positioned. The first component 110 including the first gear 141 is operably coupled to the first input power source 101 at the first input interface 111. The second component 120 including the second gear 142 is operably coupled to the second input power source 102 at the second input interface 121. In various embodiments, the first and second components 110, 120 define an intermediate shaft or layshaft configured to transfer power from the respective input power source 101, 102 to the power output component 103.

In various embodiments, the first component 110 including the first gear 141 includes a component centerline axis 105A different from the second component 120 including the second gear 142 including component centerline axis 105B. In various embodiments, the first component 110 is positioned along a first radial distance $R_1$ from the gear assembly centerline axis 104 different from the second component 120 positioned along a second radial distance $R_2$. As such, the component centerline axis 105A at the first component 110 is positioned differently from the gear assembly centerline axis 104 in contrast to the component centerline axis 105B at the second component 120.

In still various embodiments, the first component 110 includes a third gear 143. The second component 120 includes a fourth gear 144. The first component 110 is operably coupled to the power output component 103 at the first output interface 113. The second component 120 is operably coupled to the power output component 103 at the second output interface 123.

In various embodiments, the power output component 103 is coupled to the first component 110 and the second component 120 at the respective output interfaces 113, 123. In certain embodiments, such as depicted in FIG. 3A, the first output interface 113 is positioned inward along a radial direction R from the component centerline axis 105A, 105B. In one embodiment, the power output component 103 includes a gear 137A, 137B. The gear 137A at the power output component 103 is coupled to or meshed at the static component assembly 140 at the first output interface 113 positioned inward along the radial direction R from the component centerline axis 105 (e.g., toward the gear assembly centerline axis 104). The power output component 103 including the gear 137A is connected at the third gear 143 to the power output component 103 at the first output interface 113.

Referring still to FIG. 3A, in certain embodiments, the gear 137B at the power output component 103 includes a ring gear 126 positioned outward along the radial direction R from the component centerline axis 105A, 105B. The power output component 103 including the ring gear 126 is connected at or meshed to the fourth gear 144 at the power output component 103 at the second output interface 123.

In various embodiments, such as depicted in FIG. 3B, the second output interface 123 is positioned inward along radial direction R from the component centerline axis 105B. The gear 137A at the power output component 103 is coupled to or meshed at the static component assembly 140 at the second output interface 123 positioned inward along the radial direction R from the component centerline axis 105 (e.g., toward the gear assembly centerline axis 104). The power output component 103 including the gear 137A is connected at the fourth gear 144 to the power output component 103 at the second output interface 123.

Referring still to FIG. 3B, in certain embodiments, the gear 137B at the power output component 103 includes ring gear 126 positioned outward along the radial direction R from the component centerline axis 105A, 105B. The power output component 103 including the ring gear 126 is connected at or meshed to the third gear 143 at the power output component 103 at the first output interface 113.

Referring to FIGS. 3A-3B, there is an inner clearance 139A and an outer clearance 139B. The inner clearance 139A is positioned inward along radial direction R from gear 137B. The outer clearance 139B is positioned outward along radial direction R from gear 137A. In various embodiments, the first component 110 is connected (e.g., meshed) to the power output component 103 at a first radius (e.g., at gear 137A) and is separate (e.g., not meshed) at a second radius (e.g., clearance 139B). In still various embodiments, the second component 120 is separate (e.g., not meshed) to the power output component 103 at the first radius (e.g., clearance 139A) and is connected (e.g., meshed) to the power output component 103 at the second radius (e.g., at gear 137B). The gear assembly 100 at an inner radius relative to the component centerline 105A is connected to the first component 110 and separate or disconnected from the second component 120. The gear assembly 100 at an outer radius relative to the component centerline 105B is connected to the second component 120 and separate or disconnected from the first component 110.

During operation of the gear assembly 100, the static component assembly 140 is fixed relative to the gear assembly centerline axis 104. It should be appreciated that the gear assembly centerline axis 104 may be the same as the engine centerline axis 12 (FIG. 1, FIGS. 2A-2B). The gear assembly 100 may include a plurality of the components 110, 120 and respective gears of the static component assembly 140. In certain embodiments, the gear assembly 100 includes a plurality of the first gear 141 and the second gear 142 in circumferential arrangement relative to the gear assembly centerline axis 104. In various embodiments, the component centerline axis 105 is extended through each respective static component assembly 140 or gear 141, 142, 143, 144. The respective gears 141, 142, 143, 144 may include their respective component centerlines 105 circumferentially separated from one another around the gear assembly centerline axis 104. As power is provided from one or both input sources 101, 102, the respective gears 141, 142 to which the input sources 101, 102 are attached each rotate around their respective component centerlines 105. The static component 140, or particularly the first and second components 110, 120 provided in regard to FIGS. 3A-3B each rotate in a direction opposite of their respective input source, such as depicted via signs "+" and "−".

Referring still to the embodiment depicted in FIGS. 3A-3B, the gear assembly 100 includes a 2-stage arrangement in which the first input interface 111 and the second input interface 121 are axially spaced apart from one another. In various embodiments, the output interfaces 113, 123 are radially spaced apart from one another. The first output interface 113 and the second output interface 123 may generally or substantially be positioned co-planar to one another, such as e.g., along a similar or substantially same longitudinal position relative to the gear assembly centerline axis 104. Referring to FIGS. 3A-3B, the first input interface 111 at the first gear 141 is positioned more distal to the output interfaces 113, 123 than the second input interface 121 at the second gear 142.

Embodiments of the gear assembly 100 such as depicted and described in regard to FIGS. 3A-3B allow for two relatively high-speed counter-rotating input power sources 101, 102 to connect and transmit power to the gear assembly 100 with one relatively low-speed power output component 103 connected to the gear assembly 100 to receive power. In certain embodiments, the gear assembly 100 includes a first gear ratio between the first input power source 101 and the power output source 103 to be approximately 11:1 or less. In still certain embodiments, the gear assembly 100 includes a second gear ratio between the second input power source 102 and the power output source 103 to be approximately 7:1 or less.

It should be appreciated that the static component assembly 140, gears 141, 142, 143, 144 and interfaces 111, 113, 121, 123 together include gears, gear meshes, splines, etc., in certain arrangements. In certain embodiments, such as depicted and described in regard to FIGS. 3A-3B, the gear assembly 100 is arranged as a compound gear assembly. The gear assembly 100 including a compound gear assembly may allow for ranges of gear ratios such as provided herein in a radial and/or axial spacing that is simpler, lighter, or otherwise more desirable than e.g., an epicyclic gear assembly. Various embodiments of the gear assembly 100 provided herein allow for equalizing rotation of motion of the counter-rotating input sources 101, 102 to the power output component 103 by engaging the sun gear of the second stage with one input power source (e.g., first input power source 101) and engaging the ring gear of the second stage with the other input power source (e.g., second input power source 102). However, it should be appreciated that equalizing direction of rotation of the counter-rotating input sources 101, 102 to the power output component 103 may include engaging the sun gear of the second stage with the second input power source 102 and engaging the ring gear of the second stage with the first input power source 101. Additionally, or alternatively, embodiments of the gear assembly 100 may allow for co-rotation or counter-rotation of a booster, low pressure compressor, or intermediate pressure compressor, or other compressor 22 positioned in flow arrangement between the fan assembly 14 and the HP compressor 24 (FIGS. 1-2).

Referring now to FIGS. 4A, 4B, and 5, embodiments of the gear assembly 100 according to aspects of the present disclosure are provided. The embodiments provided in regard to FIGS. 4A, 4B, and 5 may be configured substantially similarly as depicted and described in regard to FIGS. 3A-3B. Regarding, FIGS. 4A, 4B, and 5, the first input power source 101 is connected to a static component assembly 140 defining a compound gear. The static component assembly 140 is coupled directly to the first input power source 101 at a first input interface 111. The second input power source 102 is connected to the static component assembly 140 via an idler gear 115. The idler gear 115 allows the static component assembly 140 to receive the second input power source 102 at a rotational direction opposite of the first input power source 101. The idler gear 115 is positioned at a second input interface 121 at the static component assembly 140. The second input power source 102 is connected to the idler gear 115 at interface 122.

The gear assembly 100 is configured to receive the first input power source 101 at a greater rotational speed than the second input power source 102. In various embodiments, the interfaces 111, 113, 121 include gear meshes, splines, or gear configurations. In certain embodiments, the first gear 141 provides a greater radius at the first input interface 111 than the second gear 142 at the second input interface 121 relative to the component centerline axis 105. In still certain embodiments, the first gear 141 and the second gear 142 each provide greater radii than the third gear 143 at the output interface 113 relative to the component centerline axis 105.

In various embodiments, the power output component 103 includes a ring gear 126 or a gear 137 connected to the output interface 113. In one embodiment, such as depicted in regard to FIG. 4A, the power output component 103 includes a rotatable shaft including the gear 137 connected at an inner radius at which the output interface 113 is positioned. In another embodiment, such as depicted in regard to FIG. 5, the power output component 103 includes a rotatable shaft including the ring gear 126 connected to an outer radius at which the output interface 113 is positioned.

Referring to FIGS. 3A-3B, 4A-4B, and FIG. 5, although not depicted in detail, it should be appreciated that the gear assembly 100 may further include static structures to allow for desired rotation of the gears 141, 142, 143 around each respective axis 105 to transfer torque and allow rotation of the power output component 103 around the gear assembly centerline axis 104. For instance, the gear assembly 100 may include a ring gear at which the static component assembly 140 reacts when receiving input torque from the respective input sources 101, 102, such as to allow for rotation of the power output component 103 around the gear assembly centerline axis 104. It should be appreciated that one skilled in the art would reasonably ascertain positioning of static structures to induce a desired reaction, rotation, and torque transfer from the input sources 101, 102 to the power output component 103.

Embodiments of the gear assembly 100 such as depicted and described in regard to FIGS. 4A-4B and FIG. 5 allow for two relatively high-speed counter-rotating input power sources 101, 102 to connect and transmit power to the gear assembly 100 with one relatively low-speed power output component 103 connected to the gear assembly 100 to receive power. In certain embodiments, the gear assembly 100 includes a first gear ratio between the first input power source 101 and the power output source 103 to be approximately 12:1 or less. In still certain embodiments, the gear assembly 100 includes a second gear ratio between the second input power source 102 and the power output source 103 to be approximately 7:1 or less.

Referring now to FIGS. 6A-6B and FIGS. 7A-7B, embodiments of a gear assembly 100 according to aspects of the present disclosure are provided. Embodiments depicted in regard to FIGS. 6A-6B are configured substantially similarly as one another. It should be appreciated that embodiments provided in regard to FIG. 6A omit for clarity certain features otherwise depicted in FIG. 6B. Embodiments depicted in regard to FIGS. 7A-7B are configured substantially similarly as one another. It should be appreciated that embodiments provided in regard to FIG. 7A omit for clarity certain features otherwise depicted in FIG. 7B. The engine 10 and gear assembly 100 include two separately rotatable shafts, such as the first input power source 101 and the second input power source 102 described above. The gear assembly 100 includes a static component assembly 140 configured to allow power or torque transfer from one or more of the input power sources 101, 102 to the power output component 103. In various embodiments, the static component assembly 140 is connected to one or the other of the input power sources 101, 102. In still various embodiments, the gear assembly 100 includes a power output component 103 connected to the static component assembly 140 and the other of the input power sources 101, 102. In one embodiment, such as depicted in FIGS. 6A-6B, the static component assembly 140 is connected to the first input power source 101 at the first input interface 111. The power output component 103 is connected to the second input power source 102 at the second input interface 121. In another embodiments, such as depicted in FIGS. 7A-7B, the static component assembly 140 is connected to the second input power source 102 at the second input interface 121. The power output component 103 is connected to the first power input source 101 at the first input interface 111.

Referring to FIGS. 6A-6B and FIGS. 7A-7B, the gear assembly 100 includes a first gear 141 configured to rotate around a respective component centerline axis 105A, 105B for each gear. In certain embodiments, the first gear 141 includes a planet gear. The first gear 141 is fixed from rotation around the gear assembly centerline axis 104 by the static component assembly 140. The first gear 141 transfers power or torque from the input power source to the power output component 103 at a second output interface 123. The first gear 141 is rotatable relative to its respective component centerline axis 105A. In still certain embodiments, the static component assembly 140 and the power output component 103 are coupled together at a static interface 145. In certain embodiments, the static interface 145 provides a fixed structure against which the power output component 103 reacts to allow for rotation of the power output component 103 around the gear assembly centerline axis 104.

Referring still to FIGS. 6A-6B and FIGS. 7A-7B, the static component assembly 140 and the power output component 103 are coupled together at a first output interface 113. The static component assembly 140 and the power output component 103 are further coupled together at a second output interface 123. In certain embodiments, the power output component 103 includes a planet gear 131. The planet gear 131 at the power output component 103 is coupled to the static component assembly 140 at the first output interface 113. In various embodiments, the static component assembly 140 includes a first ring gear 126 positioned in contact with the planet gear 131 at the power output component 103. The planet gear 131 at the power output component 103 is further coupled to one of the input power sources 101, 102 (e.g., the second input power source 102 such as depicted in FIGS. 6A-6B or the first input power source 101 such as depicted in FIGS. 7A-7B). The planet gear 131 at the power output component 103 is configured to rotate around its respective component centerline axis 105B. The power output component 103 with the planet gear 131 is configured to rotate around the gear assembly centerline axis 104.

In various embodiments, the power output component 103 includes a carrier assembly 135. The carrier assembly 135 is configured to couple the power output component 103 in contact with one of the input power sources 101, 102 and the static component assembly 140. In still various embodiments, the carrier assembly 135 positions the planet gear 131 of the power output component 103 at the first output interface 113. In certain embodiments, such as depicted in FIGS. 6A-6B, the carrier assembly 135 positions the planet gear 131 of the power output component 103 at the second input interface 121 in contact with the second input power source 102. In other embodiments, such as depicted in FIGS. 7A-7B, the carrier assembly 135 positions the planet gear 131 of the power output component 103 at the first input interface 111 in contact with the first input power source 101.

Referring to FIGS. 6A-6B and FIGS. 7A-7B, in various embodiments, the carrier assembly 135 includes the second ring gear 127 positioned in contact with the first gear 141 at the static component assembly 140. In still certain embodiments, the carrier assembly 135 includes a bearing interface 138 positioned in contact with the static component assembly 140 at the static interface 145. It should be appreciated that, in various embodiments, the bearing interface 138 includes a bearing race, a bearing support, a fluid film bearing interface, or bearing assembly, such as described in regard to bearing 160.

Referring to FIGS. 6A-6B and FIGS. 7A-7B, during operation of the engine 10 and gear assembly 100, the first input power source 101 and the second input power source 102 each rotate around the gear assembly centerline axis 104, such as in counter-rotating directions exemplified by the "+" and "−" signs. The static component assembly 140 provides a fixed or grounded source at which the first gear 141 is fixed relative to a circumferential direction C relative to the gear assembly centerline axis 104. The first gear 141 at the static component assembly 140 is allowed to rotate relative to the component centerline axis 105A. The power output component 103 is allowed to rotate along the circumferential direction C relative to the gear assembly centerline axis 104. The static component assembly 140 provides a fixed or grounded source against which the power output component 103 may react to allow rotation around the gear assembly centerline axis 104. In certain embodiments, the static component assembly 140 provides a fixed source at the static interface 145 against which the bearing interface 138 of the power output component 103 reacts to at least partially allow for rotation of the power output component 103. In still certain embodiments, the static component assembly 140 provides a fixed source at the first output interface 113 against which the planet gear 131 of the power output component 103 reacts to at least partially allow for rotation of the power output component 103. The planet gear 131 of the power output component 103 is allowed to rotate with the carrier assembly 135 around the gear assembly centerline axis 104. The planet gear 131 of the power output component 103 is further allowed to rotate relative to the component centerline axis 105B of the respective planet gear 131.

In certain embodiments, the static interface 145 includes a bearing 160 including a fluid transfer bearing. The static interface 145 including the fluid transfer bearing provides for flow of lubricant at the static interface 145 between the static component assembly 140 and the power output component 103.

Embodiments of the gear assembly 100 provided in regard to FIGS. 6A-6B and FIGS. 7A-7B provide an arrangement of two epicyclic stages. One epicyclic stage is a star gear configuration (e.g., the first input power source 101 in FIGS. 6A-6B or the second input power source 102 in FIGS. 7A-7B) and the other epicyclic stage is a planet gear configuration (e.g., the second input power source 102 in FIGS. 6A-6B or the first input power source 101 in FIGS. 7A-7B). Embodiments depicted and described in regard to FIGS. 6A-6B and FIGS. 7A-7B provide parallel load or power input paths from the respective input power sources 101, 102. The gear assembly 100 further provides for equalization of direction of rotation of the power output component 103 relative to one or the other of the input power sources 101, 102.

Embodiments of the gear assembly 100 provided in regard to FIGS. 6A-6B and FIGS. 7A-7B may provide certain benefits over known gear assemblies, such as reduced part count, reduced complexity, increased efficiency via parallel load paths, and/or lighter weight. One or more of such benefits may include removing or obviating a double-planet stage in contrast to known gear assemblies. In various embodiments, the gear assembly 100 may include gear ratios of up to 7:1.

Referring now to FIGS. 8A-8C, embodiments of a gear assembly 100 according to aspects of the present disclosure are provided. Embodiments depicted in regard to FIGS. 8A-8C are configured substantially similarly as one another. It should be appreciated that embodiments provided in regard to FIG. 8A omit for clarity certain features otherwise depicted in FIGS. 8B-8C. The engine 10 and gear assembly 100 include two separately rotatable shafts, such as the first input power source 101 and the second input power source 102 described above. The gear assembly 100 includes a static component assembly 140. The static component assembly 140 is fixed relative to the gear assembly centerline axis 104. In certain embodiments, the static component assembly 140 includes a planet carrier assembly including a first gear 141. Referring to FIGS. 8A-8B, the first gear 141 is coupled to the first input power source 101 at the first interface 111. Referring to FIG. 8C, the first gear 141 is coupled to the second input power source 102 at the second interface 121.

The static component assembly 140 including a planet carrier assembly may further include a second gear 142. Referring to FIGS. 8A-8B, the second gear 142 is coupled to the second input power source 102 at the second interface 121. Referring to FIG. 8C, the second gear 142 is coupled to the first input power source 101 at the first interface 111. The second gear 142 is further coupled to the power output component 103 at a power output interface 113. In certain embodiments, the power output component 103 includes a ring gear 126. The power output component 103 including the ring gear 126 is coupled to the static component assembly 140 at the power output interface 113.

Referring to FIGS. 8A-8C, during operation of the engine 10 and gear assembly 100, the first input power source 101 provides power or torque and rotates along a first circumferential direction relative to the gear assembly centerline axis 104. The second input power source 102 provides power or torque and rotates a second circumferential direction opposite of the first circumferential direction. The first gear 141 is fixed relative to the gear assembly centerline axis 104 and allowed to rotate relative to its respective component centerline axis 105A. The static component assembly 140 including a planet carrier assembly with the first gear 141 is operably coupled to the second gear 142. In certain embodiments, the gears 141, 142 are in at least partially adjacent arrangement next to one another and operably coupled together.

During operation of the gear assembly 100, the second gear 142 is fixed relative to the gear assembly centerline axis 104 and allowed to rotate relative to its respective component centerline axis 105B. The first gear 141 coupled to the second gear 142 transfers power from the first input power source 101 to the second gear 142. The second gear 142 rotates about its component centerline axis 105B along a circumferential direction opposite of the first gear 141. The second gear 142 coupled to the power output component 103 allows for direction of rotation of the power output component 103 opposite of the second input power source 102 and co-directional to the first input power source 101.

Embodiments of the gear assembly 100 provided in regard to FIGS. 8A-8C may provide certain benefits over known gear assemblies, such as parallel torque paths, relatively lighter weight, and/or reduced size. One or more of such benefits may include a common ring gear and a common planet gear, such as to reduce part count, weight, and/or provide parallel torque paths. In various embodiments, the gear assembly 100 may include gear ratios of up to 7:1.

Referring now to FIG. 8D, an embodiment of a gear assembly 100 according to aspects of the present disclosure is provided. Embodiments depicted and described in regard to FIG. 8D may be configured substantially similarly as described in regard to FIGS. 8A-8C. In FIG. 8D, the gear assembly 100 includes a first gear 141 operably coupled to the power output component 103 at a first ring gear 126 at a first power output interface 113. The first gear 141 is operably connected to the first input power source 101 at the first input interface 111. The gear assembly 100 includes a second gear 142 operably coupled to the second input power source 102 at the second input interface 121. A third gear 143 is operably coupled to the power output component 103 at a second gear 127 at a second power output interface 123. The second gear 142 and the third gear 143 are operably connected to one another at a gear interface 134 to transfer power from the second input power source 102 to the power output component 103.

During operation of the gear assembly 100, the gears 141, 142, 143 are fixed relative to the gear assembly centerline axis 104 and allowed to rotate relative to each of their respective component centerline axes 105A, 105B, 105C. The second gear 142 coupled to the third gear 143 transfers power from the second input power source 102 to the power output component 103 via the second output interface 123. The first gear 141 transfers power from the first input power source 101 to the power output component 103 via the first output interface 113.

Embodiments of the gear assembly 100 provided in regard to FIG. 8D may provide certain benefits over known gear assemblies, such as parallel torque paths (e.g., reducing failure risks in contrast to serial torque paths), relative light weight and size (e.g., for smaller gear ratios). One or more benefits may include a common ring gear and a common planet gear, such as to reduce part count, weight, and/or provide parallel torque paths. In various embodiments, the gear assembly 100 may include gear ratios of up to 7:1.

Referring now to FIGS. 9A-9C, an embodiment of a gear assembly 100 according to aspects of the present disclosure is provided. Embodiments of the gear assembly 100 provided in regard to FIGS. 9A-9B are configured substantially similarly as the gear assembly 100 depicted and described in regard to FIGS. 8A-8B. The engine 10 and gear assembly 100 include two separately rotatable shafts, such as the first input power source 101 and the second input power source 102 described above. The gear assembly 100 includes a static component assembly 140. The static component assembly 140 is fixed relative to the gear assembly centerline axis 104. The input power sources 101, 102 are each coupled directly to a power output component 103. In certain embodiments, the power output component 103 is rotatable along the circumferential direction C relative to the gear assembly centerline axis 104.

In certain embodiments, the power output component 103 includes a first gear 131 and a second gear 132 each rotatable relative to their respective component centerline axes 105A, 105B. The first gear 131 and the second gear 132 may define planet gears or other appropriate gear types. In various embodiments, such as depicted in regard to FIGS. 9A-9B, the first input power source 101 is coupled to the first gear 131 at a first input interface 111. The second input power source 102 is coupled to the second gear 132 at a second input interface 121. In other embodiments, such as depicted in regard to FIG. 9C, the second input power source 102 is coupled to the first gear 131 at a second input interface 121. The first input power source 101 is coupled to the second gear 132 at a first input interface 111. Referring to FIGS. 9A-9C, the first gear 131 is coupled to the static component assembly 140 at a first output interface 113. In certain embodiments, the static component assembly 140 includes a ring gear 126 coupled to the first gear 131 at the first output interface 113. The first gear 131 is coupled to the second gear 132 at a gear interface 134.

During operation of the gear assembly 100 such as depicted and described in regard to FIGS. 9A-9B, the first input power source 101 provides power to the power output component 103 via the first gear 131 at the first input interface 111. Additionally, the second input power source 102 provides power to the power output component 103 via the second gear 132 at the second input interface 121. In other embodiments, such as in regard to FIG. 9C, the first input power source 101 provides power to the power output component 103 via the second gear 132 at the first input interface 111. Additionally, the second input power source 102 provides power to the power output component 103 via the first gear 131 at the second input interface 121. Referring to FIGS. 9A-9C, during operation, the first input power source 101 rotates along a first circumferential direction and the second input power source 102 rotates along a second circumferential direction opposite of the first circumferential direction. The first gear 131 allows for power input from the first input power source 101 to be received at the power output component 103 and to rotate the power output component 103 co-directional to the first input power source 101. The second gear 132 allows for power input from the second input power source 102 to be received at the power output component 103, and to have the rotational direction equalized with the first input power source 101 via the gear interface 134.

Referring now to FIG. 9D, an embodiment of a gear assembly 100 according to aspects of the present disclosure is provided. Embodiments depicted and described in regard to FIG. 9D may be configured substantially similarly as described in regard to FIGS. 9A-9C. In FIG. 9D, the gear assembly 100 includes a first gear 131 operably coupled to the power output component 103 at a first ring gear 126 at a first power output interface 113. The first gear 131 is operably connected to the second input power source 102 at the second input interface 121. The gear assembly 100 includes a second gear 132 operably coupled to the first input power source 101 at the first input interface 111. A third gear 133 is operably coupled to the power output component 103 at a second ring gear 127 at a second power output interface 123. The second gear 132 and the third gear 133 are operably connected to one another at a gear interface 134 to transfer power from the first input power source 101 to the power output component 103.

During operation of the gear assembly 100, the gears 131, 132, 133 are fixed relative to the gear assembly centerline axis 104 and allowed to rotate relative to each of their respective component centerline axes 105A, 105B, 105C. The second gear 132 coupled to the third gear 133 transfers power from the first input power source 101 to the power output component 103 via the first output interface 113. The first gear 131 transfers power from the second input power source 102 to the power output component 103 via the second output interface 123.

Referring now to FIGS. 10A-10C, embodiments of a gear assembly 100 according to aspects of the present disclosure are provided. Embodiments of the gear assembly 100 provided in regard to FIGS. 10A-10C are configured substantially similarly as the gear assembly 100 depicted and described in regard to FIGS. 9A-9B.

Embodiments depicted in regard to FIGS. 10A-10C are configured substantially similarly as one another. It should be appreciated that embodiments provided in regard to FIG. 10A omit for clarity certain features otherwise depicted in FIG. 10C. The gear assembly 100 includes a power output component 103 coupled directly to a first input power source 101 and a second input power source 102. In certain embodiments, the power output component 103 includes a first gear 131 coupled to the first input power source 101 at a first input interface 111. In still certain embodiments, the power output component 103 includes a second gear 132 and a third gear 133. The second gear 132 is coupled to the second input power source 102 at a second input interface 121.

Referring still to FIGS. 10A-10C, the gear assembly 100 includes a static component assembly 140 coupled to each of the first gear 131 and the second gear 132. The static component assembly 140 provides a fixed or grounded structure against which the power output component 103 reacts to rotate along the circumferential direction C relative to the gear assembly centerline axis 104. In certain embodiments, the static component assembly 140 includes a first ring gear 126 coupled to the first gear 131 at a first output interface 113. In still certain embodiments, the static component assembly 140 includes a second ring gear 127 coupled to the third gear 133 at a second output interface 123.

The power output component 103 including the first, second, and third gears 131, 132, 133 is allowed to rotate along a circumferential direction relative to a gear assembly centerline axis 104. In certain embodiments, the power output component 103 is configured to rotate along a first circumferential direction co-directional to the first input power source 101 and opposite of the second input power source 102. During operation of the engine 10 and gear assembly 100, the third gear 133 is coupled to the second gear 132 at a gear interface 134. Each gear 131, 132, 133 is allowed to rotate relative to each respective component centerline axis 105A, 105B, 105C of each respective gear 131, 132, 133. Additionally, each respective component centerline axis 105A, 105B, 105C rotates with the power output component 103 along a circumferential direction C relative to the gear assembly centerline axis 104.

Embodiments of the gear assembly 100 provided in regard to FIGS. 9A-9D and FIGS. 10A-10C may provide certain benefits over known gear assemblies, such as parallel torque paths, relatively lighter weight, and/or reduced size. One or more of such benefits may include a rotating output planet carrier and a static ring gear, such as to reduce part count, weight, and/or reduce size. In various embodiments, the gear assembly 100 may include gear ratios of up to 8:1.

Referring now to FIGS. 11A-11B, embodiments of a gear assembly 100 according to aspects of the present disclosure are provided. Embodiments depicted in regard to FIGS. 11A-11B are configured substantially similarly as one another. It should be appreciated that embodiments provided in regard to FIGS. 11A-11B omit for clarity certain features otherwise depicted in FIGS. 11A-11B. Certain embodiments or aspects of the gear assembly 100 according to FIGS. 11A-11B are configured substantially similarly as described and above. The engine 10 and gear assembly 100 include two separately rotatable shafts, such as the first input power source 101 and the second input power source 102 described above. The gear assembly 100 includes a static component assembly 140 connected to the first input power source 101. In certain embodiments, the static component assembly 140 includes a first gear 141 coupled to the first input power source 101 at a first input interface 111. The first gear 141 is rotatable relative to its respective component centerline axis 105A and fixed relative to the gear assembly centerline axis 104.

Referring still to FIGS. 11A-11B, the static component assembly 140 includes a second gear 142 coupled to the second input power source 102 at a second input interface 121. In certain embodiments, the gear assembly 100 includes an idler gear assembly 115 coupled to the static component assembly 140. In various embodiments, the idler gear assembly 115 includes a ring gear 118 coupled to the static component assembly 140. In still various embodiments, the idler gear assembly 115 includes a sun gear 119. In certain embodiments, the idler gear assembly 115 includes the ring gear 118 coupled to the first gear 141 at the static component assembly 140 at a first interface 116. In still certain embodiments, the idler gear assembly 115 includes the sun gear 119 coupled to the third gear 143 at the static component assembly 140 at a second interface 117. In one embodiment, the idler gear assembly 115 is an integral assembly of the ring gear 118 and the sun gear 119. The idler gear assembly 115 is configured to rotate along the circumferential direction C relative to the gear assembly centerline axis 104.

Referring to FIGS. 11A-11B, during operation of the engine 10 and gear assembly 100, the first input power source 101 provides power or torque to the idler gear assembly 115 via the first gear 141 at the static component assembly 140. The first gear 141 is allowed to rotate relative to its respective component centerline axis. The first gear 141 is fixed relative to the gear assembly centerline axis 104. Power and torque transfer to the idler gear assembly 115 to allow the idler gear assembly 115 to rotate along the circumferential direction C relative to the gear assembly centerline 104. In certain embodiments, the idler gear assembly 115 is configured to rotate along the circumferential direction C opposite of the first input power source 101.

In certain embodiments, such as depicted in regard to FIGS. 11A-11B, the power output component 103 includes a first ring gear 126 and a second ring gear 127. The first ring gear 126 and the second ring gear 127 are each coupled to the static component assembly 140. The first ring gear 126 is coupled to the second planet gear at the static component assembly 140 at a first output interface 113. The second ring gear 127 is coupled to the second gear 142 at the static component assembly 140 at a second output interface 123.

During operation of the engine 10 and the gear assembly 100, such as depicted in regard to FIGS. 11A-11B, the second input power source 102 provides power or torque to the power output component 103 via the static component assembly 140. The second gear 142 and the third gear 143 are each fixed relative to the gear assembly centerline axis 104. The second gear 142 is rotatable relative to its respective component centerline axis 105B separately from the third gear 143 rotatable relative to its component centerline axis 105C. During operation, the second input power source 102 provides power or torque to the power output component 103 via the second gear 142 at the static component assembly 140 at the second output interface 123. The first input power source 101 provides power or torque to the power output component 103 via the first gear 141 at the static component assembly 140, the idler gear assembly 115, and the third gear 143 at the static component assembly 140 at the first output interface 113.

Embodiments of the gear assembly 100 provided in regard to FIGS. 11A-11B may provide certain benefits over known gear assemblies, such as increased efficiency via parallel load paths. One or more of such benefits may include removing or obviating a double-planet stage in contrast to known gear assemblies. In various embodiments, the gear assembly 100 may include gear ratios of up to 12:1.

Referring now to FIGS. 11C-11D, embodiments of a gear assembly 100 according to aspects of the present disclosure are provided. Embodiments depicted in regard to FIGS. 11C-11D are configured at least in part similarly as depicted and described in regard to FIGS. 11A-11B. In FIGS. 11C-11D, the idler gear assembly 115 is coupled to the static component assembly 140 at the first gear 141. The idler gear assembly 115 is coupled to the power output component 103 at a first planet gear 131, such as described herein. The power output component 103 is operably coupled to the static component assembly 140 at a bearing interface 138, such as described herein.

Referring to FIG. 11D, the power output component 103 includes a first ring gear 126 and a second ring gear 127. The power output component 103 is operably coupled to the static component assembly 140 at the ring gears 126, 127. The static component assembly 140 includes the first gear 141 and the second gear 142. The second gear 142 is coupled to the second input source 102 and the second ring gear 127 such as described in regard to FIGS. 11A-11B. The first gear 141 is coupled to the idler gear assembly 115 and the first ring gear 126 at the power output component 103.

Embodiments of the gear assembly 100 provided in regard to FIGS. 11C-11D may provide a three-stage gear arrangement without a double-planet gear. Certain benefits over known gear assemblies may include increased efficiency via parallel load paths. One or more of such benefits may include removing or obviating a double-planet stage in contrast to known gear assemblies. In various embodiments, the gear assembly 100 may include gear ratios of up to 14:1.

Referring now to FIGS. 12A-12C, embodiments of a gear assembly 100 according to aspects of the present disclosure are provided. Embodiments depicted in regard to FIGS. 12A-12B are configured substantially similarly as one another. It should be appreciated that embodiments provided in regard to FIG. 12A omit for clarity certain features otherwise depicted in FIG. 12B. The engine 10 and gear assembly 100 include two separately rotatable shafts, such as the first input power source 101 and the second input power source 102 described above. The gear assembly 100 includes a static component assembly 140 connected to the first input power source 101. In certain embodiments, the static component assembly 140 includes a first gear 141 coupled to the first input power source 101 at a first input interface 111.

Referring to FIGS. 12A-12B, the gear assembly 100 includes a static component assembly 140 connected to the second input power source 102. In certain embodiments, the static component assembly 140 includes a second gear 142 coupled to the second input power source 102 at a second input interface 121. The second input power source 102 includes a ring gear 118 configured to couple to the first gear 141 at the static component assembly 140 at a first interface 118. The second input power source 102 further includes a sun gear 119 configured to couple to the second gear 142 at the static component assembly 140 at the second input interface 121.

Referring to FIG. 12C, the power output component 103 includes a planet gear 131 operably connected to the second input power source 102. The planet gear 131 at the power output component 103 is operably connected to the static component assembly 140 at a ring gear 126. The planet gear 131 at the power output component 103 reacts against the ring gear 126 at the static component assembly 140 when power or torque is provided from the second input source 102.

During operation of the gear assembly 100, such as depicted in regard to FIGS. 12A-12B, power or torque is transferred from the first input power source 101 to the ring gear 118 at the second input power source 102 via the first gear 141 at the static component assembly 140. The gears 141, 142 are each fixed circumferentially relative to the gear assembly centerline axis 104. The respective gears 141, 142 are allowed to rotate relative to their respective component centerlines 105A, 105B. During operation, power or torque is transferred serially from the first input power source 101 to the second input power source 102 via the first gear 141 at the static component assembly 140. Power is transferred from the second input power source 102 to the power output component 103 via the second gear 142 at the static component assembly 140.

Embodiments of the gear assembly 100 provided in regard to FIGS. 12A-12C may provide certain benefits over known gear assemblies, such as reduced size or packaging. One or more of such benefits may include allowing relatively high input speeds from one or both input power sources. In various embodiments, the gear assembly 100 may include gear ratios of up to 12:1.

Referring now to FIGS. 13A-13B, embodiments of a gear assembly 100 according to aspects of the present disclosure are provided. Embodiments depicted in regard to FIGS. 13A-13B may be configured at least in part such as described in regard to FIGS. 3A-12C. In FIGS. 13A-13B, the power output component 103 includes a first planet gear 131 and a second planet gear 132, such as described herein. The first input power source 101 is operably coupled to the power output component 103 at a first planet gear 131 to receive and transmit power therethrough. In regard to FIG. 13A, the second input power source 102 is operably coupled to the static component assembly 140 at the first gear 141. The first gear 141 is operably coupled to the power output component 103 at the power output interface 113. In certain embodiments, the power output component 103 includes a ring gear at the power output interface 113 such as described herein. In regard to FIG. 13B, the second input power source 102 is operably coupled to the power output component 103 at a second planet gear 132 to receive and transmit power therethrough.

Referring to FIGS. 13A-13B, the power output component 103 includes an idler gear assembly 115. The idler gear assembly 115 is operably coupled to the static component 140, such as at the static interface 145. In certain embodiments, such as depicted in FIG. 13A, the idler gear assembly 115 is operably coupled to the second planet gear 132 at the power output component 103. In still certain embodiments, such as depicted in FIG. 13B, the idler gear assembly 115 is operably coupled to the first gear 141 at the static component assembly 140.

Referring to FIGS. 13A-13B, a bearing 160 is positioned between portions 103A, 103B of the power output component 103. In certain embodiments, an inter-shaft bearing 161 is operably connected to rotatable portions 103A, 103B of the power output component 103. A first portion 103A is connected to the first planet gear 131 and the static component assembly 140 (e.g., coupled to the static component assembly 140 at static interface 145). In certain embodiments, such as depicted in FIG. 13B, the first portion 103A is connected to the first gear 141 of the static component assembly 140. In other embodiments, such as depicted in FIG. 13A, the first portion 103A is connected to the second planet gear 132. The first planet gear 131 rotates circumferentially around the gear assembly centerline axis 104 and drives the idler gear assembly 115 including the first portion 103A accordingly. The inter-shaft bearing 161 supports the second portion 103B as the second portion 103B is driven by power received from the second input power source 102 (e.g., via power transmitted through the first gear 141 in FIG. 13A or via the second planet gear 132 in FIG. 13B). Power from the first input power source 101 is transmitted from the first portion 103A through an interface at a gear at which the second portion 103B is connected (e.g., second planet gear 132 in FIG. 13A or first gear 141 at the static component assembly 140 in FIG. 13B). In various embodiments, the first portion 103A is driven by the first input power source 101 and the second portion 103B is driven by the second input power source 102.

Embodiments of the gear assembly 100 provided in regard to FIGS. 13A-13B may provide a three stage gear arrangement without a double-planet gear. Certain benefits over known gear assemblies may include increased efficiency via parallel load paths. One or more of such benefits may include removing or obviating a double-planet stage in contrast to known gear assemblies. In various embodiments, the gear assembly 100 may include gear ratios of up to 14:1.

Embodiments of the gear assembly 100 depicted and described in regard to FIGS. 3A-13B may provide for gear ratios and arrangements that fit within the $L/D_{max}$ constraints of the engine 10 such as depicted and described in regard to FIGS. 1, 2A-2B. In certain embodiments, the gear assembly 100 depicted and described in regard to FIGS. 3A-123B allow for gear ratios and arrangements providing for rotational speed of the fan assembly 14 (FIG. 1, FIGS. 2A-2B) corresponding to one or more ranges of cruise altitude and/or cruise speed provided above. It should be appreciated that embodiments of the gear assembly 100 provided herein may allow for large gear ratios (e.g., up to approximately 12:1 or greater) such as provided herein. Embodiments of the gear assembly 100 may provide desired gear ratios within constraints such as, but not limited to, length (L) of the engine 10 (FIG. 1), maximum diameter ($D_{max}$) of the engine 10, $L/D_{max}$ of the engine 10 (FIG. 1), cruise altitude of up to 65,000 ft, and/or operating cruise speed of up to Mach 0.85, or combinations thereof.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

Further aspects of the invention are provided by the subject matter of the following clauses:

1. A turbomachine engine (10), the engine (10) comprising a fan assembly (14) comprising a plurality of fan blades (13), and a core engine (16) surrounded by an outer casing (18), wherein the core engine (16) comprises a power output component (103) operably connected to the fan assembly (14), a first input power source (101) and a second input power source (102), wherein the first input power source (101) is counter-rotatable relative to the second input power source (102), a gear assembly (100) operably connected to the power output component (103) and configured to receive power from the first input power source (101) and the second input power source (102).

2. The engine (10) of any clause herein, wherein the gear assembly (100) comprises a gear ratio of up to 12:1 relative to the fan assembly (14) and one or more of the first input power source (101) and the second input power source (102).

3. The engine (10) of any clause herein, wherein the outer casing (18) comprises a maximum diameter ($D_{max}$) and a length (L) extended from an upstream end (98) to a downstream end (99), wherein a ratio of length to maximum diameter ($L/D_{max}$) 2.5 or less.

4. The engine (10) of any clause herein, wherein the first input power source (101) is rotatable at a high-speed than the second input power source (102).

5. The engine (10) of any clause herein, wherein the first input power source (101) is coupled to the gear assembly (100) at a first interface (111) and the second input power source (102) is coupled to the gear assembly (100) at a second interface (121) in parallel arrangement with the first interface (111).

6. The engine (10) of any clause herein, wherein the gear assembly (14) comprises a static component (140) coupled to the power output component (103), wherein the static component (140) is fixed relative to a gear assembly centerline axis (104).

7. The engine (10) of any clause herein, wherein the static component (140) comprises a gear (141)(142) coupled to at least one of the first input power source (101) or the second input power source (102).

8. The engine (10) of any clause herein, wherein the first input power source (101) is coupled to the static component (140) at a first interface (111) configured to receive the first input power source (101) in a first circumferential direction relative to the gear assembly centerline axis (104).

9. The engine (10) of any clause herein, wherein the second input power source (102) is coupled to the static component (140) at a second interface (121) configured to receive the second input power source (102) in a second circumferential direction opposite of the first input power source (101).

10. The engine (10) of any clause herein, wherein the static component (140) comprises a first gear (141) and a second gear (142), wherein the first gear (141) is coupled to the first input power source (101) at a first interface (111), and wherein the second gear (142) is coupled to the second input power source (102) at a second interface (121).

11. The engine (10) of any clause herein, wherein the first gear (141) is coupled to the power output component (103) at a first output interface (113) and the second gear (142) is coupled to the power output component (103) at a second output interface (123).

12. The engine (10) of any clause herein, wherein the first interface (111) and the second interface (121) are axially separated from one another.

13. The engine (10) of any clause herein, wherein the power output component (103) comprises a ring gear and a sun gear, and wherein the ring gear is coupled to the static component (140) at one of the first output interface (113) or the second output interface (123), and wherein the sun gear is coupled to the other of the second output interface (123) or the first output interface (113) different from the ring gear.

14. The engine (10) of any clause herein, wherein the gear assembly (100) comprises an idler gear (115) coupled to the second input power source (102) at the second interface (121).

15. The engine (10) of any clause herein, wherein the power output component (103) comprises a first gear (141) coupled to a static component (140) at a first output interface (113), wherein the first gear (141) is coupled to the first power input source (101) at the first interface (111).

16. The engine (10) of any clause herein, wherein the power output component (103) comprises a second gear (142) coupled to the first gear (141), wherein the second gear (142) is coupled to the second power input source (102) at the second interface (121).

17. The engine (10) of any clause herein, wherein the power output component (103) comprises a second gear (142) coupled to the static component (140) at a second output interface (123), wherein the second gear (142) is coupled to a third gear (151) at a static interface (145), and wherein the third gear (151) is coupled to the second power output component (102) at the second interface (121).

18. A gear assembly for a turbomachine of any clause herein, the gear assembly including a reference gear assembly centerline axis extended therethrough, the gear assembly comprising a first input power source rotatable relative to the gear assembly centerline axis; a second input power source rotatable relative to the gear assembly centerline axis; a power output component rotatable relative to the gear assembly centerline axis; a static component coupled to the power output component, wherein the static component is fixed relative to the gear assembly centerline axis.

19. The gear assembly of any clause herein, wherein the first input power source is rotatable at a higher speed than the second input power source.

20. The gear assembly of any clause herein, wherein the static component includes a first component including a first gear and a second component including a second gear.

21. The gear assembly of any clause herein, wherein the first component includes a first component centerline axis and the second component includes a second component centerline axis, wherein the first component centerline axis is spaced differently from the gear assembly centerline axis than the second component centerline axis.

22. The gear assembly of any clause herein, wherein the power output component is coupled to the first component at a first output interface, and wherein the power output component is coupled to the second component at a second output interface.

23. The gear assembly of any clause herein, wherein the power output component includes a ring gear at which the power output component is coupled to the first component at the first output interface.

24. The gear assembly of any clause herein, wherein the power output component includes a gear positioned inward along a radial direction from the first component centerline axis at which the power output component is coupled to the first component at the first output interface.

25. The gear assembly of any clause herein, wherein the power output component includes a ring gear at which the power output component is coupled to the second component at the second output interface.

26. The gear assembly of any clause herein, wherein the power output component includes a gear positioned inward along a radial direction from the second component centerline axis at which the power output component is coupled to the second component at the second output interface.

27. The gear assembly of any clause herein, the gear assembly comprising a first gear at which the first input power source is coupled.

28. The gear assembly of any clause herein, wherein the first component comprises the first gear at which the first input power source is coupled.

29. The gear assembly of any clause herein, the gear assembly comprising a second gear at which the second input power source is coupled.

30. The gear assembly of any clause herein, wherein the second component comprises the second gear at which the second input power source is coupled.

31. The gear assembly of any clause herein, the gear assembly comprising a third gear at which the power output component is coupled.

32. The gear assembly of any clause herein, the first component comprises the third gear at which the power output source is coupled.

33. The gear assembly of any clause herein, the gear assembly comprising a fourth gear at which the power output component is coupled.

34. The gear assembly of any clause herein, the second component comprises the fourth gear at which the power output source is coupled.

35. The gear assembly of any clause herein, comprising an idler gear coupled to the second input power source and the second gear at the static component.

36. The gear assembly of any clause herein, the power output component comprising a planet gear.

37. The gear assembly of any clause herein, the planet gear at the power output component coupled to the static component at a first output interface.

38. The gear assembly of any clause herein, the planet gear at the power output component coupled to the first input power source at the first input interface.

39. The gear assembly of any clause herein, the planet gear at the power output component coupled to the static component at a second output interface.

40. The gear assembly of any clause herein, the planet gear at the power output component coupled to the second input power source at the second input interface.

41. The gear assembly of any clause herein, the power output component comprising a carrier assembly.

42. The gear assembly of any clause herein, the carrier assembly at the power output component coupled to a first gear at the static component, and wherein the carrier assembly is coupled to a static interface.

43. The gear assembly of any clause herein, the static component comprising a first gear coupled to the first input power source at a first input interface, and wherein the static component comprises a second gear coupled to the second input power source at a second input interface.

44. The gear assembly of any clause herein, the first gear and the second gear coupled together at a gear interface.

45. The gear assembly of any clause herein, the second gear coupled to the power output component at a first power output interface.

46. The gear assembly of any clause herein, the power output component comprising a first gear coupled to the first input power source at a first input interface, and wherein the power output component comprises a second gear coupled to the second input power source at a second input interface.

47. The gear assembly of any clause herein, the first gear at the power output component and the second gear at the power output component are together coupled together at a gear interface.

48. The gear assembly of any clause herein, the first gear coupled to the power output component at a first power output interface.

49. The gear assembly of any clause herein, the power output component comprising a first gear coupled to the first input power source at a first input interface, and wherein the first gear is coupled to a first ring gear at the static component, and wherein the power output component comprises a second gear coupled to the second input power source at a second input interface, and wherein the power output component comprises a third gear coupled to the second gear at a gear interface, and wherein the third gear is coupled to a second ring gear at the static component.

50. The gear assembly of any clause herein, the static component comprising a first gear, a second gear, and a third gear, and wherein the gear assembly comprises an idler gear, wherein the first gear is coupled to the first input power source and the idler gear, and wherein the second gear is coupled to the second input power source and the power output component at a second output interface, and wherein the third gear is coupled to the power output component at a first output interface, and wherein the third gear is coupled to the idler gear.

51. The gear assembly of any clause herein, the second input power source comprises a ring gear and a sun gear.

52. The gear assembly of any clause herein, wherein the static component comprises a first gear and a second gear, wherein the first gear is coupled to the first input power source and the ring gear at the second input power source, and wherein the second gear is coupled to the power output component and the sun gear at the second input power source.

53. The gear assembly of any clause herein, wherein the gear assembly receives power from the first input power source in serial arrangement with power from the second input power source.

54. The gear assembly of any clause herein, wherein the gear assembly receives power from the first input power source and the second input power source in parallel arrangement.

The invention claimed is:

1. A turbomachine engine comprising:
a fan assembly comprising a plurality of fan blades; and
a core engine surrounded by an outer casing, wherein the core engine comprises:
a power output component operably connected to the fan assembly, the power output component including a planet gear;
a first input power source and a second input power source, wherein the first input power source is counter-rotatable relative to the second input power source; and
a gear assembly operably connected to the power output component and configured to receive power from the first input power source and the second input power source, the gear assembly comprising a ring gear that rotates circumferentially about a gear assembly centerline axis, wherein the planet gear rotates circumferentially about the gear assembly centerline axis, and wherein one of the first input power source or the second input power source is coupled to the planet gear through the gear assembly, rotation of the one of the first input power source or the second input power source causes the ring gear to rotate, and the ring gear is coupled to the other one of the first input power source or the second input power source.

2. The turbomachine engine of claim 1, wherein the gear assembly comprises a gear ratio of up to 14:1 relative to the fan assembly and one or more of the first input power source and the second input power source.

3. The turbomachine engine of claim 1, wherein the outer casing comprises a maximum diameter and a length extended from an upstream end to a downstream end, wherein a ratio of length to maximum diameter is 2.5 or less.

4. The turbomachine engine of claim 1, wherein the first input power source is rotatable at a higher speed than the second input power source.

5. The turbomachine engine of claim 1, wherein the first input power source is coupled to the gear assembly at a first interface and the second input power source is coupled to the gear assembly at a second interface in parallel arrangement with the first interface.

6. The turbomachine engine of claim 1, wherein the gear assembly comprises a static component coupled to the power output component, wherein the static component is fixed relative to the gear assembly centerline axis.

7. The turbomachine engine of claim 6, wherein the ring gear is a first ring gear, and the planet gear is coupled to the static component at a second ring gear.

8. The turbomachine engine of claim 6, wherein the static component comprises a gear coupled to at least one of the first input power source or the second input power source.

9. The turbomachine engine of claim 1, wherein the gear assembly includes a first epicyclic stage and a second epicyclic stage, the first epicyclic stage being a star configuration, and the second epicyclic stage being a planet configuration.

10. The turbomachine engine of claim 9, wherein one of the first input power source or the second input power source is coupled to the first epicyclic stage, and wherein the other one of the first input power source or the second input power source is coupled to the second epicyclic stage.

11. A gear assembly comprising:
a power output component operably coupled to a fan assembly of a turbomachine engine, the power output component including a planet gear;
a first input power source; and
second input power source, wherein the first input power source is counter-rotatable relative to the second input power source,
wherein the gear assembly is operably connected to the power output component and configured to receive power from the first input power source and the second input power source, the gear assembly comprising a ring gear that rotates circumferentially about a gear assembly centerline axis, wherein the planet gear rotates circumferentially about the gear assembly centerline axis, and wherein one of the first input power source or the second input power source is coupled to the planet gear through the gear assembly, rotation of the one of the first input power source or the second input power source causes the ring gear to rotate, and the ring gear is coupled to the other one of the first input power source or the second input power source.

12. The gear assembly of claim 11, wherein the gear assembly comprises a gear ratio of up to 14:1 relative to the fan assembly and one or more of the first input power source and the second input power source.

13. The gear assembly of claim 11, wherein the first input power source is coupled to the gear assembly at a first interface and the second input power source is coupled to the gear assembly at a second interface in parallel arrangement with the first interface.

14. The gear assembly of claim 11, wherein the gear assembly comprises a static component coupled to the power output component, wherein the static component is fixed relative to the gear assembly centerline axis.

15. The gear assembly of claim 14, wherein the ring gear is a first ring gear, and the planet gear is coupled to the static component at a second ring gear.

16. The gear assembly of claim 14, wherein the static component comprises a gear coupled to at least one of the first input power source or the second input power source.

17. The gear assembly of claim 11, wherein the gear assembly includes a first epicyclic stage and a second epicyclic stage, the first epicyclic stage being a star configuration, and the second epicyclic stage being a planet configuration.

18. The gear assembly of claim 17, wherein one of the first input power source or the second input power source is coupled to the first epicyclic stage, and wherein the other one of the first input power source or the second input power source is coupled to the second epicyclic stage.

* * * * *